(12) United States Patent
Ichikawa et al.

(10) Patent No.: US 10,026,943 B2
(45) Date of Patent: Jul. 17, 2018

(54) METHOD FOR MANUFACTURING BATTERY WIRING MODULE

(71) Applicant: YAZAKI CORPORATION, Tokyo (JP)

(72) Inventors: Yoshiaki Ichikawa, Shizuoka (JP); Hirotaka Mukasa, Shizuoka (JP); Hirokuni Koike, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 169 days.

(21) Appl. No.: 15/163,770

(22) Filed: May 25, 2016

(65) Prior Publication Data

US 2016/0268579 A1   Sep. 15, 2016

Related U.S. Application Data

(63) Continuation of application No. PCT/JP2014/084369, filed on Dec. 25, 2014.

(30) Foreign Application Priority Data

Dec. 25, 2013   (JP) .................. 2013-267767

(51) Int. Cl.
H01M 2/20   (2006.01)
H01R 43/00   (2006.01)
(Continued)

(52) U.S. Cl.
CPC .......... *H01M 2/206* (2013.01); *H01M 2/202* (2013.01); *H01R 43/16* (2013.01);
(Continued)

(58) Field of Classification Search
CPC ........ G01S 11/12; G01S 13/867; G01S 13/91; G01S 13/92; G01S 17/023; G01S 17/88;
(Continued)

(56) References Cited

U.S. PATENT DOCUMENTS 9,150,115 B2 * 10/2015 Ikeda ................... H02G 3/0437
9,184,431 B2 * 11/2015 Frias ..................... H01M 2/204
(Continued)

FOREIGN PATENT DOCUMENTS

JP    2010-114025 A    5/2010
JP    2011-49047 A    3/2011
(Continued)

OTHER PUBLICATIONS

International Search Report for PCT/JP2014/084369 dated Feb. 17, 2015 [PCT/ISA/210].

*Primary Examiner* — Minh Trinh
(74) *Attorney, Agent, or Firm* — Sughrue Mion, PLLC

(57) ABSTRACT

Provided is a method for manufacturing a battery wiring module including: a coating step of coating a first long side portion of a flat plate conductor and a plurality of linear conductors following the first long side portion by a first insulating resin portion and of coating a second long side portion of the flat plate conductor and a plurality of linear conductors following the second long side portion by a second insulating resin portion; and a cutting step of cutting the insulating resin portion so that the plurality of busbars is divided into a plurality of busbar groups and the plurality of linear conductors coated by any one of the first insulating resin portion and the second insulating resin portion and the busbar groups are separated.

20 Claims, 17 Drawing Sheets

(51) Int. Cl.
*H01R 43/16* (2006.01)
*H01R 4/30* (2006.01)
*H01R 31/08* (2006.01)

(52) U.S. Cl.
CPC ........... *H01M 2220/20* (2013.01); *H01R 4/30* (2013.01); *H01R 31/08* (2013.01)

(58) Field of Classification Search
CPC .. H01M 2220/20; H01M 2/202; H01M 2/206; H01R 31/08; H01R 43/16; H01R 4/30
See application file for complete search history.

(56) References Cited

U.S. PATENT DOCUMENTS

| | | | |
|---|---|---|---|
| 9,716,262 B2* | 7/2017 | Ichikawa | H01M 2/206 |
| 2012/0212232 A1 | 8/2012 | Ikeda et al. | |
| 2014/0254122 A1 | 9/2014 | Nakamura et al. | |
| 2016/0172650 A1* | 6/2016 | Ichikawa | H01M 2/206 |
| | | | 29/623.1 |
| 2016/0172651 A1* | 6/2016 | Ichikawa | H01M 2/206 |
| | | | 429/121 |
| 2016/0172652 A1* | 6/2016 | Ichikawa | H01M 2/206 |
| | | | 429/121 |
| 2016/0268579 A1* | 9/2016 | Ichikawa | H01M 2/202 |

FOREIGN PATENT DOCUMENTS

| | | |
|---|---|---|
| JP | 2013-037777 A | 2/2013 |
| JP | 2013-105571 A | 5/2013 |
| JP | 2014-164854 A | 9/2014 |
| WO | 2011/052699 A1 | 5/2011 |
| WO | 2013/054731 A1 | 4/2013 |

* cited by examiner

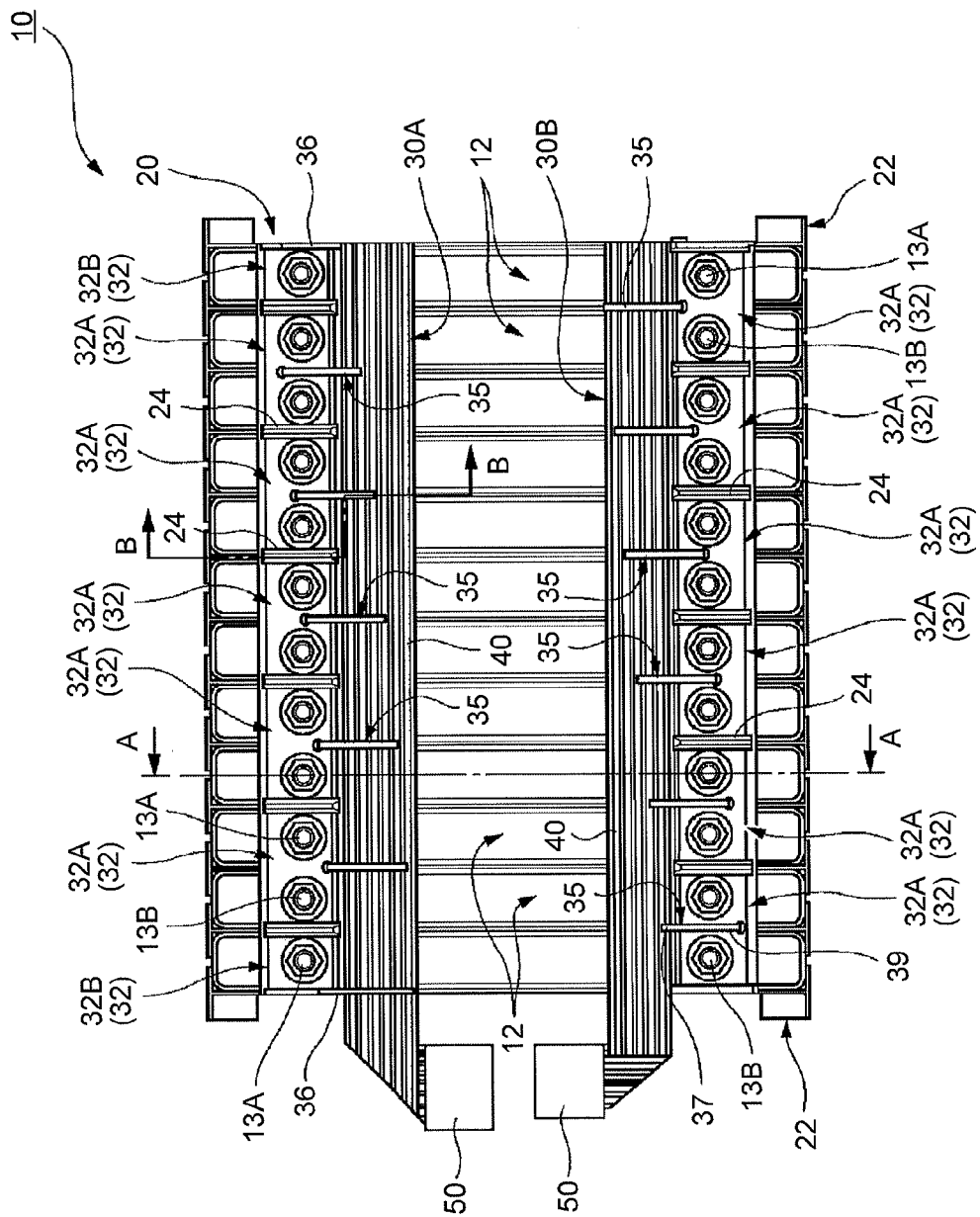

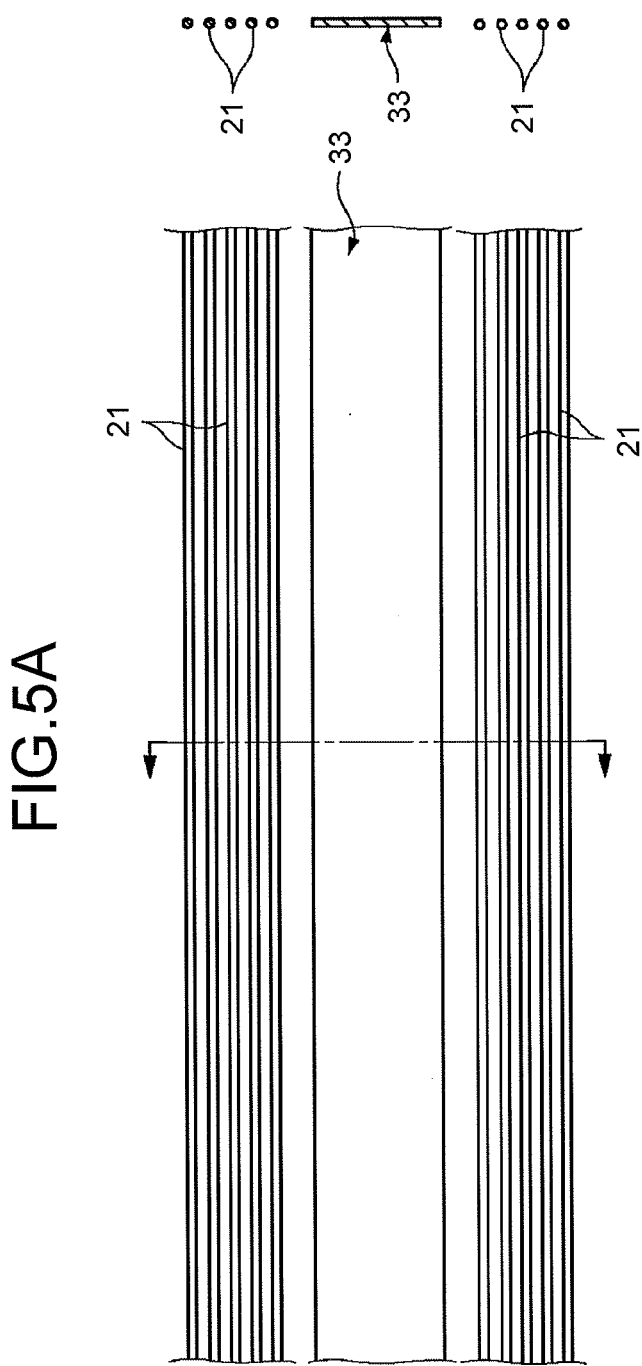

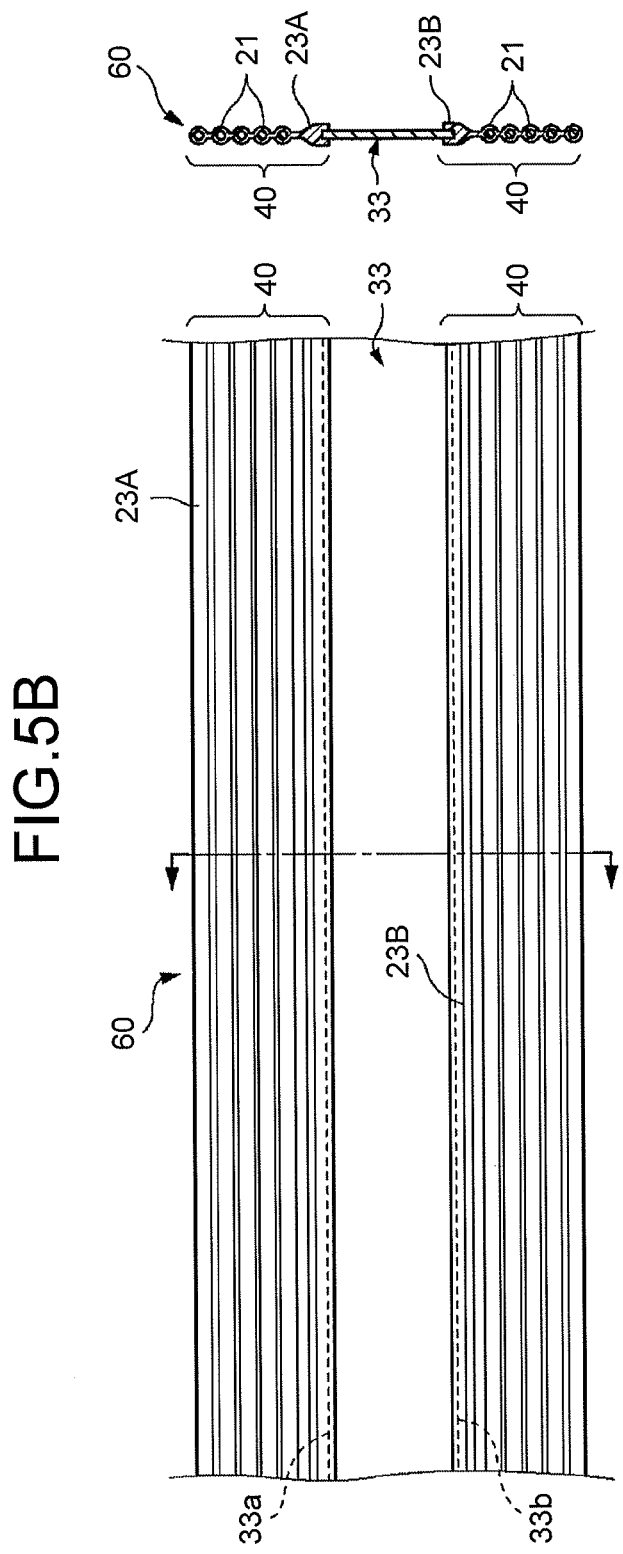

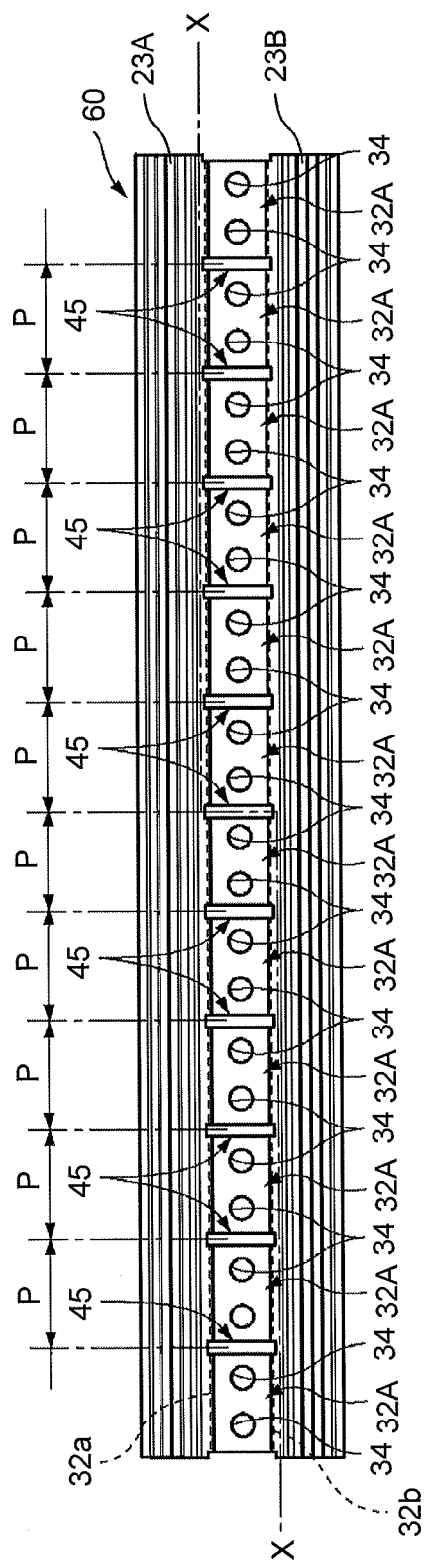

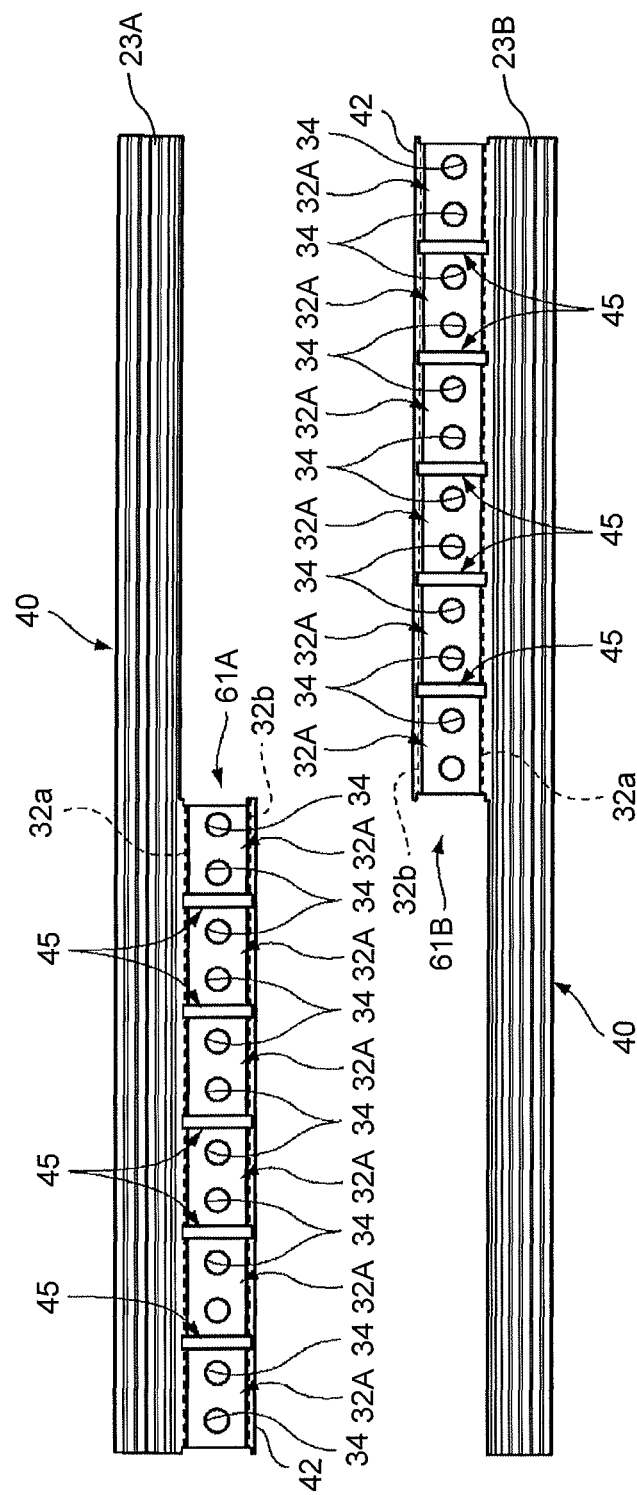

METHOD FOR MANUFACTURING BATTERY WIRING MODULE

CROSS-REFERENCE TO RELATED APPLICATION

This application is a continuation application of International Application PCT/JP2014/084369, filed on Dec. 25, 2014, and designating the U.S., the entire contents of which are incorporated herein by reference.

BACKGROUND OF THE INVENTION

1. Field of the Invention

The present invention relates to a method for manufacturing a battery wiring module.

2. Description of the Related Art

An in-vehicle battery pack which is connected to a power converter for driving a motor is mounted on a vehicle such as a hybrid vehicle or an electric vehicle. The battery pack is equipped with a battery module including a plurality of battery cells. In the battery module, the battery cells overlap one another so that one-side electrode terminals of the battery cells are arranged in a line and the other-side electrode terminals thereof are arranged in a line. In the battery pack, the electrode terminals of the adjacent battery cells are connected to each other by a connection member such as a busbar so that the plurality of battery cells is connected in series or in parallel. Then, there is a case in which an electric wire is connected to each of the connection members. For this reason, when the battery module is assembled, there is a need to connect the electrode terminals at a plurality of positions by the connection members and to route the electric wires connected to the connection members on the battery module. Hitherto, a busbar module obtained by insert-molding a plurality of connection members in insulating resin has been used.

Incidentally, when the plurality of battery cells is connected in series or in parallel, there is a possibility that the durability of the battery cell may be degraded when a battery characteristic such as a voltage across the battery cells is not uniform. Here, in order to stop a charging or discharging operation before abnormality occurs in the voltage across the battery cells in the in-vehicle battery pack, the above-described electric wire (the voltage detection line) for detecting the voltage of the battery cell is provided in each connection member (each busbar). However, the plurality of voltage detection lines in the busbar module is routed on the battery module in a bound state. For this reason, when the number of the voltage detection lines is large in such a busbar module, the bound voltage detection lines are thickened. Thus, there is a possibility that the voltage detection line is not easily bent or is increased in weight so that the wiring is not easily made.

Further, the busbar module of the related art employs a structure in which the front end of the coated voltage detection line is peeled, a round terminal is crimped to an exposed core wire, the round terminal is fitted to an electrode terminal of the battery cell, and the round terminal is fixed to a male screw portion of the electrode terminal along with a connection member by a nut. For this reason, there is a possibility that the busbar module may cause a voltage drop due to an increase in resistance of a contact surface between the connection member and the round terminal.

Here, in the battery pack of the related art, there is proposed a high-voltage detection module device (a busbar module) capable of easily wiring the battery cells with a simple structure and suppressing a voltage drop (for example, see Japanese Patent Application Laid-open No. 2010-114025). In the high-voltage detection module device of the battery pack, a plurality of busbars is disposed in an insulation frame assembled to a battery pack body so that a predetermined cathode terminal and a predetermined anode terminal are connected to each other in the battery cell, a flat cable is disposed in an area of the insulation frame other than the busbar arrangement area, and a conductor line having a base notched in a predetermined shape is welded to a predetermined busbar in the conductor lines of the flat cable.

Since the high-voltage detection module device includes the insulation frame, the plurality of busbars, and the flat cable, the structure is simplified. Further, since the high-voltage detection module device is formed by a step of arranging busbars in the insulation frame, a step of separating the conductor lines of the flat cable, and a step of welding the conductor lines to the busbars, the wiring operation is simplified.

However, in the high-voltage detection module device of Japanese Patent Application Laid-open No. 2010-114025, the insulation frame has a configuration in which a plurality of protrusion portions is provided in a lower surface of a flat rectangular plate-shaped portion with a predetermined gap therebetween and a plurality of openings is provided in the plate-shaped portion with a predetermined gap therebetween. That is, in the high-voltage detection module device, the predetermined gap between the plurality of protrusion portions fitted to a gap between the battery cells and the number of the protrusion portions need to be changed in response to the size of the battery cell as well as the predetermined gap between the plurality of openings opened at a gap between the cathode terminal and the anode terminal of the battery cell and the number of openings, and the insulation frame is dedicated in accordance with the type of the battery pack. For that reason, the high-voltage detection module device has a problem in which the versatility is low and the manufacturing cost is not easily decreased.

SUMMARY OF THE INVENTION

The present invention is made in view of the above-described circumstance, and an object of the present invention is to provide a method for manufacturing a battery wiring module capable of easily wiring the battery cells with a simple structure, increasing the versatility, and decreasing the manufacturing cost.

In order to achieve the above mentioned object, a method for manufacturing a battery wiring module according to one aspect of the present invention includes a coating step of coating a first long side portion of an elongated flat plate conductor and outer peripheral portions of a plurality of linear conductors by a first insulating resin portion, the linear conductors being disposed along the first long side portion in parallel with a predetermined gap therebetween while having a predetermined gap with respect to the first long side portion, and of coating a second long side portion of the flat plate conductor and outer peripheral portions of the plurality of linear conductors by a second insulating resin portion, the linear conductors being disposed along the second long side portion in parallel with a predetermined gap therebetween while having a predetermined gap with respect to the second long side portion; a pressing step of separating the flat plate conductor at a predetermined gap in the longitudinal direction of the flat plate conductor, and of forming a plurality of busbars electrically connecting electrode terminals provided in at least two battery cells connected to each other in the same direction among the plurality of battery cells overlapping each other in the same direction, the electrode terminals being arranged in parallel in the same direction; a cutting step of cutting the insulating resin portion so that the plurality of busbars disposed in series is divided into a plurality of busbar groups and the plurality of linear conductors coated by any one insulating resin portion of the first insulating resin portion and the second insulating resin portion is separated from the busbar groups; and a connecting step of electrically connecting the plurality of linear conductors to the predetermined busbars.

According to another aspect of the present invention, in the pressing step, it is desirable that a terminal insertion hole causing the electrode terminal to be inserted therethrough is formed in each of the busbars.

According to still another aspect of the present invention, in the connecting step, it is desirable that a gap between the plurality of linear conductors of one end of the other insulating resin portion connecting the plurality of linear conductors and the busbar group is cut, and the linear conductors of the one end is electrically connected to the predetermined busbars of the busbar group.

According to still another aspect of the present invention, in the connecting step, it is desirable that one end of a connection conductor is press-connected to a predetermined linear conductor of the plurality of linear conductors connected to the busbar group through the other insulating resin portion, and the other end of the connection conductor is electrically connected to the predetermined busbar of the busbar group.

According to still another aspect of the present invention, in the pressing step, it is desirable that a cathode busbar electrically connected only to a cathode terminal and an anode busbar electrically connected only to an anode terminal are formed along with the plurality of busbars in the busbar group, and a cut raised portion is formed in each of the cathode busbar and the anode busbar, and in the connecting step, the cut raised portion is electrically connected to a predetermined linear conductor of the plurality of linear conductors connected to the busbar group through the insulating resin portion.

According to still another aspect of the present invention, before the coating step, it is desirable that the plurality of linear conductors coated by the first insulating resin portion is disposed along the first long side portion of the flat plate conductor, and the plurality of linear conductors having at least different cross-sectional shapes or physical properties is disposed along the second long side portion of the flat plate conductor.

According to still another aspect of the present invention, it is desirable to further includes a forming step of forming a connection reinforcement portion which increases a connection force of the first and second insulating resin portions with respect to the flat plate conductor in the first and second long side portions of the flat plate conductor, before the coating step.

According to still another aspect of the present invention, in the cutting step, it is desirable that the insulating resin portion as a cutting object is cut so as to be divided into the busbar group and the plurality of linear conductors.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a top view of the battery pack illustrated in FIG. 1;

FIG. 5A is a main top view and a cross-sectional view illustrating a step of arranging the battery wiring module illustrated in FIG. 1;

FIG. 5B is a main top view and a cross-sectional view illustrating a step of coating the battery wiring module illustrated in FIG. 1;

FIG. 6A is a main top view and a cross-sectional view illustrating a step of pressing the battery wiring module illustrated in FIG. 1;

FIG. 6B is a main top view and a cross-sectional view illustrating a step of cutting the battery wiring module illustrated in FIG. 1;

DETAILED DESCRIPTION OF THE PREFERRED EMBODIMENTS

Figure 1:
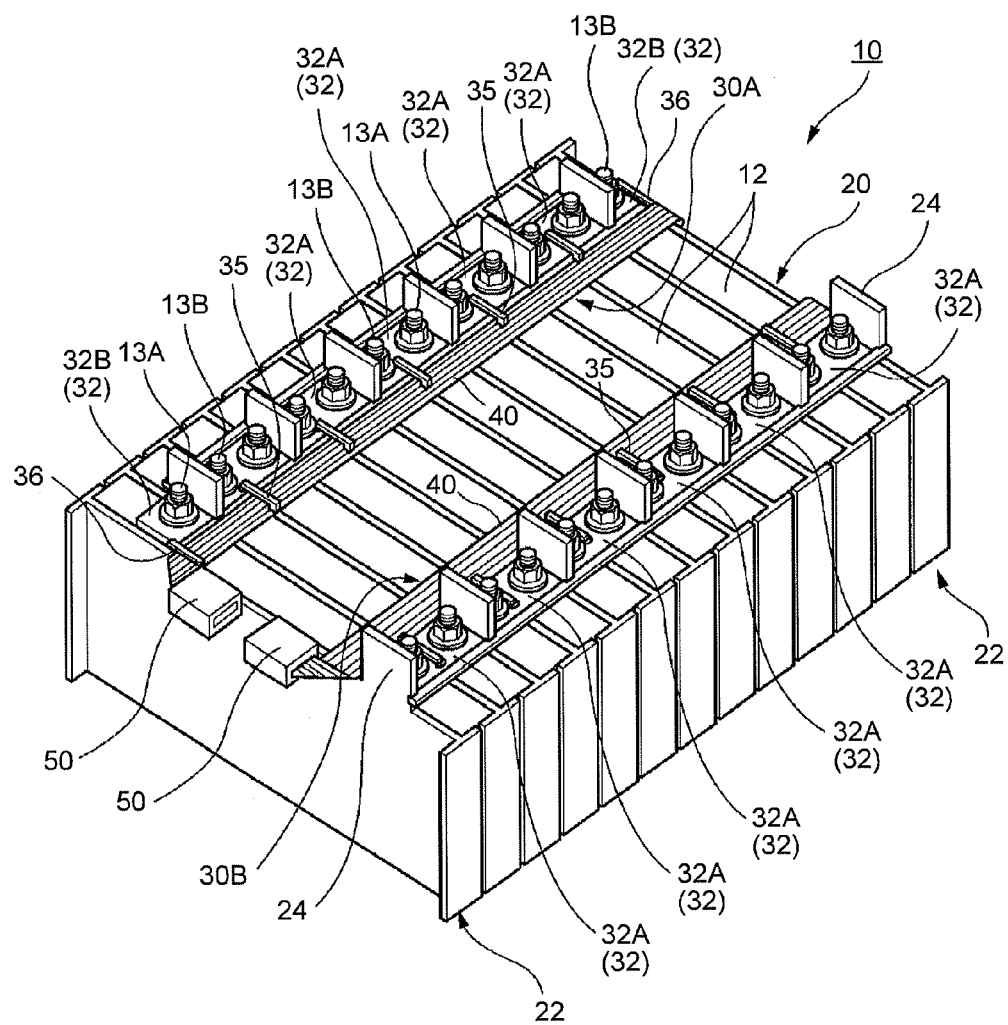
FIG. 1 is an entire perspective view of a battery pack obtained by combining a battery wiring module according to a first embodiment of the present invention.

Hereinafter, embodiments of a method for manufacturing a battery wiring module according to the present invention will be described in detail with reference to the drawings. In addition, the present invention is not limited to the embodiments.

First Embodiment

A battery wiring module is provided in a battery pack and is provided in a battery module including a plurality of battery cells. The battery pack is mounted on, for example, a vehicle such as an electric vehicle or a hybrid vehicle and is used to transmit or receive (charge or discharge) electric power to or from a rotator (an electric motor, a generator, and an electric generator) as a drive source of the vehicle through an inverter. In the battery module, the battery cells overlap one another in the same direction so that one-side electrode terminals of the battery cells are arranged in a line and the other-side electrode terminals thereof are arranged in a line. For example, as the battery module, the electrode terminals are arranged in a row so that a cathode terminal and an anode terminal are alternately arranged or the same electrode terminals are arranged. In the battery pack, one-side electrode terminals of a predetermined plurality of battery cells are connected to each other by a connection member (a first connection member) such as a busbar so that the plurality of battery cells is connected in series or in parallel. The first connection member is used to electrically connect the electrode terminals provided in at least two battery cells connected to each other in the same direction among the plurality of battery cells overlapping one another in the same direction. Here, the electrode terminals are arranged in the same direction. Further, in the battery pack, a connection member (a second connection member) such as a busbar is connected to the cathode terminal and the anode terminal disposed at both ends of the battery module. Further, a linear conductor (an electric wire) is connected to the first connection member or the second connection member. When the first and second connection members and the linear conductors can be used to check, for example, a battery state, these members can be used to transmit electric power during a charging/discharging operation. The battery wiring module of the embodiment is configured as a module of the connection members (the first and second connection members) and the linear conductor. Each battery wiring module is disposed in each row of the electrode terminals. As illustrated in FIGS. 1, 2, 3A, and 3B, a battery pack 10 of the embodiment includes a battery module 20 with a plurality of battery cells 12 and battery wiring modules 30A and 30B. The battery module 20 has a configuration in which the plurality of battery cells 12 is disposed inside a box-shaped casing (not illustrated) and is fixed therein through a separator. The battery wiring modules 30A and 30B of the embodiment are exemplified to measure the voltage (that is, the battery state) of the battery cell 12.

Each of the battery wiring modules 30A and 30B according to the embodiment includes a plurality of busbars 32 which connects the plurality of battery cells 12 in series to each other, a voltage detection line 40 which measures a voltage of each battery cell 12, and a connector 50 which is connected and fixed to one end of the voltage detection line 40. The busbar 32 is divided into a busbar (a first connection member) 32A and a busbar (a second connection member) 32B.

The battery cell 12 is a secondary battery, and includes a cathode terminal 13A and an anode terminal 13B as electrode terminals. As the battery cell 12, a cell having a rectangular parallelepiped casing or a so-called laminate cell is known. The battery cell 12 of this example has a configuration in which the cathode terminal 13A and the anode terminal 13B protrude in the same direction. For example, in the case of a cell having a rectangular parallelepiped casing, the cathode terminal 13A and the anode terminal 13B protrude from one surface of the casing. Specifically, as illustrated in FIG. 1, the battery cell 12 of the embodiment has a configuration in which the cathode terminal 13A and the anode terminal 13B protrude from the top surface (for example, a surface facing the upside of the vehicle when the battery cell is mounted on the vehicle). The battery cells 12 overlap each other so as to be connected in the same direction, and hence two rows of electrode terminals are formed so as to be arranged in the same direction. The battery cells 12 of this example overlap each other while alternately changing the direction so that the cathode terminal 13A and the anode terminal 13B are adjacent to each other in each row. That is, the cathode terminal 13A and the anode terminal 13B are alternately arranged in each row.

Figure 8A:
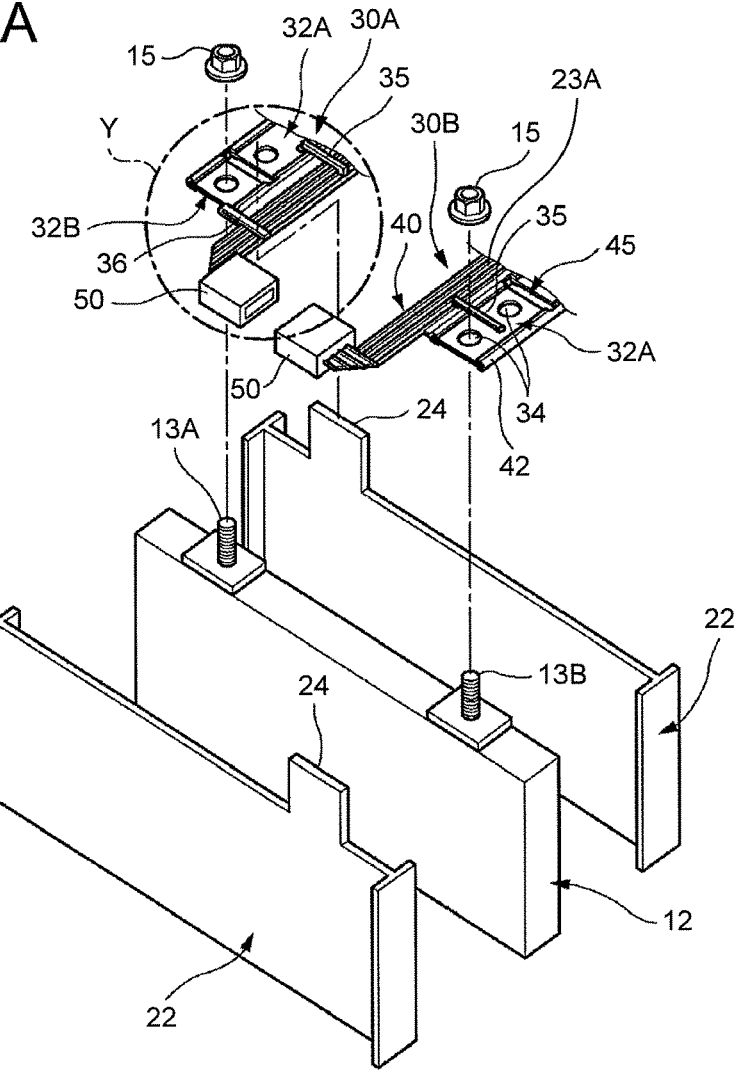
FIG. 8A is a main exploded perspective view of the battery pack illustrated in FIG. 1.

An insulating resinous separator 22 illustrated in FIG. 8A is disposed at both sides of each battery cell 12 (both side surfaces of the battery cell 12 in the overlapping direction). A partition portion 24 is formed on the upper end of the separator 22 so as to protrude upward in relation to the top surface of the battery cell 12. The partition portion 24 is inserted into a partition insertion portion 45 formed as a slit or a through-hole formed between the adjacent busbars 32. The partition insertion portion 45 is formed in an elongated rectangular shape in accordance with the shape of the plate-shaped partition portion 24. Since the partition portion 24 protrudes upward in relation to the partition insertion portion 45 (in the electrode terminal protruding direction), the short-circuiting between the electrode terminals caused by a tool is prevented. The partition insertion portion 45 is formed between the adjacent busbars 32A and between the busbar 32A and the busbar 32B adjacent to each other in the battery wiring module 30A. The partition insertion portion 45 is formed between the adjacent busbars 32A in the battery wiring module 30B. The partition insertion portion 45 is used to separate the adjacent busbars 32 from each other.

As illustrated in FIG. 2, the belt-shaped battery wiring modules 30A and 30B extending in the arrangement direction of the battery cells 12 (the overlapping direction of the battery cells 12) are disposed on the plurality of battery cells 12. Each of the battery wiring modules 30A and 30B is disposed in each row of the electrode terminals. The battery wiring module 30A includes a voltage detection line 40 including a linear conductor 21 electrically connected to the predetermined busbars 32A and 32B and a busbar row including the plurality of busbars 32A and two busbars 32B. In the busbar row of the battery wiring module 30A, the busbars 32A are arranged in the arrangement direction of the battery cell 12, and the busbar 32B is disposed at each of both ends in the arrangement direction. The two busbars 32B are respectively connected to one-side electrode terminals disposed at both ends in the overlapping battery cells 12. One busbar 32B is a cathode busbar which is electrically connected only to the cathode terminal 13A. The other busbar 32B is an anode busbar which is electrically connected only to the anode terminal 13B. Further, the battery wiring module 30B includes the voltage detection line 40 including the linear conductor 21 electrically connected to the predetermined busbar 32A and the busbar row including the plurality of busbars 32A. In the busbar row of the battery wiring module 30B, the busbars 32A are arranged in the arrangement direction of the battery cells 12. In the voltage detection lines 40, the linear conductors 21 are disposed in parallel so that the axis direction follows the arrangement direction of the battery cells 12 (that is, a direction following the busbar row) and a predetermined gap is formed therebetween. The voltage detection line 40 is disposed so that a predetermined gap is formed with respect to the busbar row. That is, a predetermined gap is formed between the busbar row and the linear conductor 21 closest to the busbar row.

Figure 4:
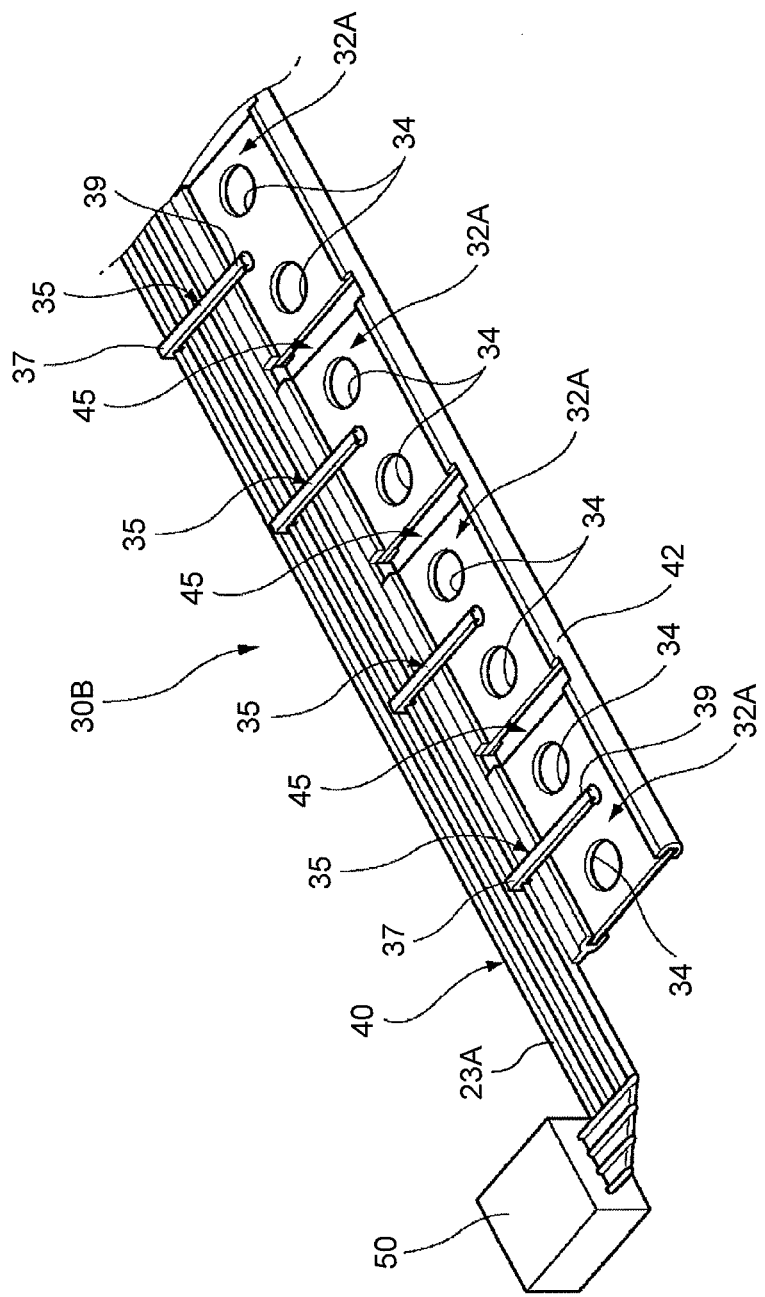
FIG. 4 is a partially perspective view of the battery wiring module illustrated in FIG. 1.

The busbar 32A is provided with one terminal insertion hole 34 through which the cathode terminal 13A is inserted and one terminal insertion hole 34 through which the anode terminal 13B is inserted in the arrangement direction of the battery cells 12 (FIG. 4). FIG. 4 is a diagram in which the battery wiring module 30B is exemplified. Further, in the battery wiring module 30A, the terminal insertion hole 34 of the cathode terminal 13A is formed at one busbar 32B, and the terminal insertion hole 34 of the anode terminal 13B is formed at the other busbar 32B. In the battery wiring module 30A of this example, two busbars 32B are disposed so as to interpose five busbars 32A therebetween. Meanwhile, six busbars 32A are arranged in the battery wiring module 30B.

As illustrated in FIGS. 4 to 6, each of the busbars 32A and 32B has a substantially rectangular shape, and the electrode terminal is inserted through the terminal insertion hole 34. The busbars 32A and 32B are formed by punching an elongated rectangular flat plate conductor 33 as a plate member formed of metal such as copper, copper alloy, aluminum, aluminum alloy, gold, and stainless steel (SUS) in a pressing step to be described below. Plating of Sn, Ni, Ag, or Au may be performed on the busbars 32A and 32B in order to improve the weldability. In the busbars 32A and 32B of the embodiment, nuts 15 are screw-connected to the cathode terminal 13A and the anode terminal 13B inserted through the terminal insertion holes 34 and are fastened. Accordingly, the busbars 32A and 32B are electrically connected to the cathode terminal 13A or the anode terminal 13B. Of course, the busbar according to the present invention may be welded to the cathode terminal and the anode terminal without forming the terminal insertion hole 34 so that an electrical connection is made. In addition, the busbars 32A and 32B may be decreased in weight by forming the corner portions in, for example, a circular-arc shape in response to the circular terminal insertion hole 34.

The voltage detection line 40 constituting the battery wiring modules 30A and 30B is formed in a flat cable shape including the plurality of linear conductors 21 disposed in parallel with a predetermined gap therebetween and an insulating resin portion (a first insulating resin portion 23A) collectively coating the outer peripheral portions of the plurality of linear conductors 21. The first insulating resin portion 23A is formed of, for example, insulating resin such as polypropylene (PP), polyvinyl chloride (PVC), polybutylene terephthalate (PBT), and polyethylene terephthalate (PET). In this example, insulating resin is extrude-molded along with the plurality of linear conductors 21 in a coating step to be described later while covering the outer peripheral portions of the linear conductors 21 so that the first insulating resin portion 23A integrated with these outer peripheral portions is formed. As the linear conductor 21, a stranded wire or a single wire of a flat conductor and a round conductor can be variously used. Further, copper alloy or aluminum alloy is used in the linear conductor 21.

In the battery wiring modules 30A and 30B, a voltage detection line 40 is disposed in at least one of two side edge portions 32a and 32b extending in the arrangement direction of the battery cells 12 of the busbar 32 (32A and 32B). In other words, the busbars 32 (32A, 32B) are disposed in parallel along at least one of the linear conductors 21 disposed at both ends in the voltage detection line 40. In the battery wiring modules 30A and 30B of the example, the plurality of linear conductors 21 is disposed in parallel with a predetermined gap therebetween along the side edge portion 32a while having a predetermined gap with respect to the side edge portion 32a of the busbar 32. In the battery wiring modules 30A and 30B, the outer peripheral portions of the plurality of linear conductors 21 and the side edge portion 32a of the busbars 32 adjacent to one of the plurality of linear conductors 21 are coated by a first insulating resin portion 23A. Further, in the battery wiring module 30A, a connection portion 42 formed of insulating resin is provided in the opposite side edge portion 32b facing the side edge portion 32a in the busbar 32. The connection portion 42 is used to connect the busbars 32 of the battery wiring modules 30A and 30B, and integrally connects the opposite side edge portions 32b while extending in the arrangement direction of the battery cells 12. A second insulating resin portion 23B is formed of the same insulating resin as the first insulating resin portion 23A. In this example, the second insulating resin portion 23B forming the connection portion 42 is extrude-molded along with the first insulating resin portion 23A. The second insulating resin portion 23B will be described below. In the battery wiring modules 30A and 30B, since the busbars 32 are held by the first insulating resin portion 23A and the connection portion 42, a positional deviation between the busbars 32 (an individual variation in the busbar 32) can be suppressed even when the first insulating resin portion 23A and the connection portion 42 are formed of flexible insulating resin. For this reason, the battery wiring modules 30A and 30B can prevent degradation in connection force between the busbar 32 and the voltage detection line 40 and improve attachment workability to the battery module 20. Thus, it is desirable to use a through-hole as the partition insertion portion 45. Of course, it is needless to say that the connection portion 42 can be omitted as long as a connection force between the voltage detection line 40 and the busbar 32 is enough.

Figure 3A:
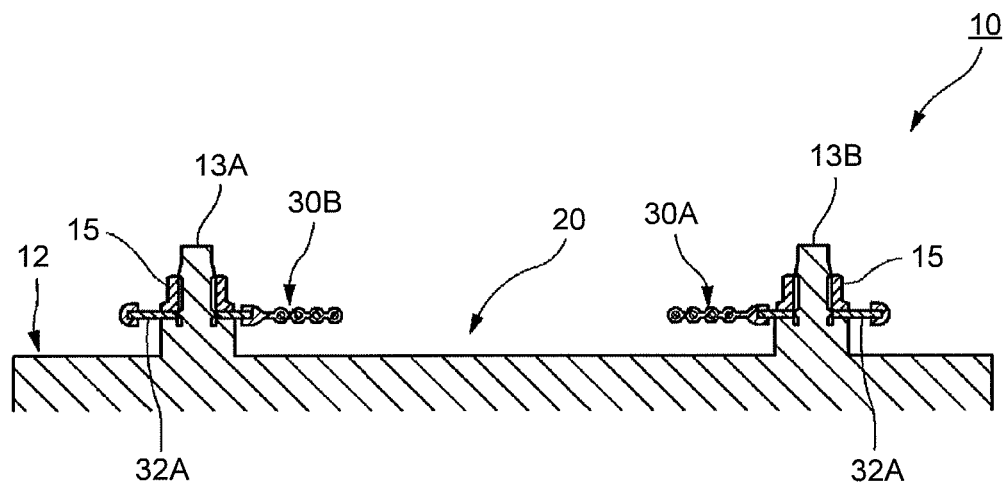
FIG. 3A is a main cross-sectional view of the battery pack taken along the line A-A of FIG. 2.
Figure 3B:
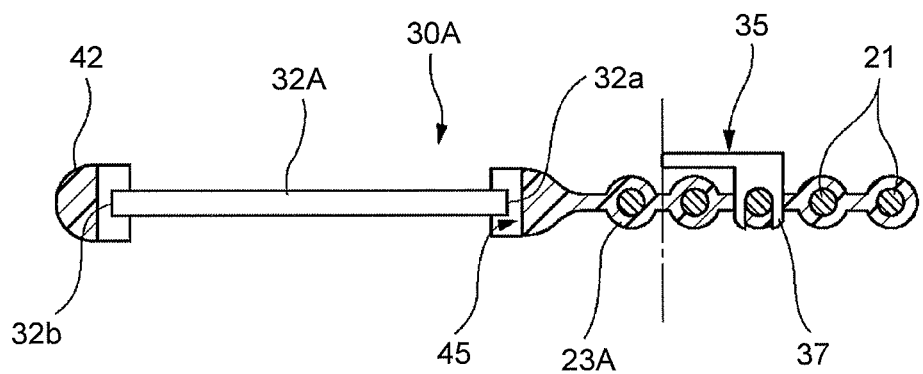
FIG. 3B is a cross-sectional view of the battery wiring module taken along the line B-B of FIG. 2.

The busbars 32A of the battery wiring modules 30A and 30B are electrically connected to the cathode terminal 13A and the anode terminal 13B adjacent to each other and are electrically connected to the corresponding linear conductor 21 of the voltage detection line 40 which detects the voltage of the battery cell 12. The busbar 32A and the linear conductor 21 are electrically connected to each other by a connection conductor 35 as an electric connection portion. The connection conductor 35 is formed by punching a metallic member so that a pressure-contact blade portion (a press-contact connection portion) 37 is provided at one end of a body and a welded portion 39 is provided at the other end thereof. Then, as illustrated in FIG. 3B, the connection conductor 35 is formed so that the pressure-contact blade portion 37 is press-connected to the predetermined linear conductor 21 and the welded portion 39 is weld-connected to the predetermined busbar 32A (see FIG. 4). In addition, the "weld-connection" of the embodiment includes various kinds of weld-connection such as spot-welding, ultrasonic-welding, and laser-welding. Further, the connection conductor is not limited to the connection conductor 35 having the pressure-contact blade portion 37 formed at one end thereof and may be variously chosen as the electric wire or the busbar based on the spirit of the embodiment.

Figure 8B:
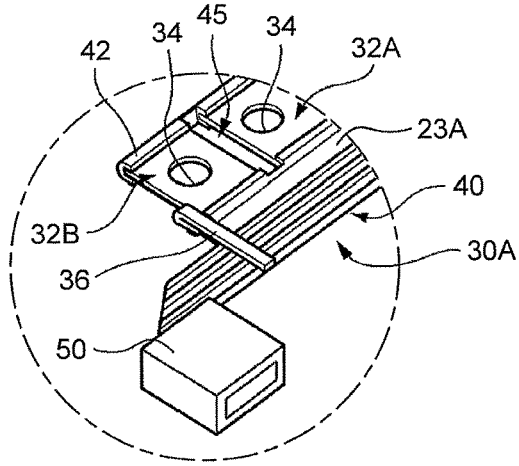
FIG. 8B is an enlarged view of a part Y of FIG. 7A.

Further, one busbar 32B of the battery wiring module 30A is electrically connected to the cathode terminal 13A of the battery cell 12 at one end in the overlapping direction. Further, the other busbar 32B is electrically connected to the anode terminal 13B of the battery cell 12 at the other end in the overlapping direction. Further, the busbar 32B is electrically connected to a predetermined linear conductor 21 which measures the voltage of the battery cell 12. The busbar 32B and the linear conductor 21 are electrically connected to each other by a cut raised portion 36 as an electric connection portion formed at the side edge of the busbar 32B (the outer edge portion in the arrangement direction of the battery cells 12). The cut raised portion 36 is formed so as to be bent along the side edge of the busbar 32B, and the front end is weld-connected to a predetermined linear conductor 21 (see FIG. 8B). When the protruding position of the front end is changed by appropriately changing the bent position of the cut raised portion 36, a predetermined linear conductor 21 to which the front end is welded can be selected. Further, when the welding position is appropriately changed without changing the bent position of the cut raised portion 36, a predetermined linear conductor 21 of which an intermediate portion is welded can be selected.

Next, a method for manufacturing the battery wiring modules 30A and 30B with the above-described configuration will be described. In addition, the battery wiring modules 30A and 30B are manufactured by the substantially same manufacturing steps unless otherwise particularly specified. In the drawing, the battery wiring module 30B is exemplified. The method for manufacturing the battery wiring modules 30A and 30B of the embodiment includes a coating step, a pressing step, a cutting step, and a connecting step. The coating step indicates a step of coating a first long side portion 33a of an elongated flat plate conductor 33 (a base portion of the side edge portion 32a) and the outer peripheral portions of the plurality of linear conductors 21 disposed in parallel along the first long side portion 33a with a predetermined gap therebetween while having a predetermined gap with respect to the first long side portion 33a by the first insulating resin portion 23A, and of coating a second long side portion 33b of the flat plate conductor 33 (a base portion of the side edge portion 32b) and the outer peripheral portions of the plurality of linear conductors 21 disposed in parallel along the second long side portion 33b with a predetermined gap therebetween while having a predetermined gap with respect to the second long side portion 33b by a second insulating resin portion 23B. The pressing step indicates a step of separating the flat plate conductor 33 in the longitudinal direction of the flat plate conductor 33 with a predetermined gap therebetween and of forming the plurality of busbars 32A electrically connecting the electrode terminals provided in at least two battery cells 12 connected to each other among the plurality of battery cells 12 overlapping each other in the same direction, the electrode terminals being arranged in the same direction. The cutting step indicates a step of cutting the insulating resin portion so that the plurality of busbars 32 disposed in series is divided into a plurality of busbar groups (in this example, two busbar groups 61A and 61B) and the busbar groups 61A and 61B and the plurality of linear conductors 21 coated by any one insulating resin portion of the first insulating resin portion 23A and the second insulating resin portion 23B are separated. The connecting step indicates a step of electrically connecting the plurality of linear conductors 21 to the predetermined busbars 32. Precisely, an arranging step of arranging the components of the battery wiring modules 30A and 30B at a predetermined positional relation exists before the coating step.

First, the arranging step and the coating step illustrated in FIGS. 5A and 5B will be described. In the arranging step, a plurality of reels on which base materials of the linear conductors 21 are respectively wound and a reel on which a base material of the flat plate conductor 33 is wound are coaxially set in a publicly known extruder. The extruder is used to extrude-mold the first insulating resin portion 23A and the second insulating resin portion 23B on the base materials while the base materials of the plurality of linear conductors 21 and the base material of the flat plate conductor 33 are disposed in parallel at a predetermined gap and are drawn from the reels. That is, the extruder performs the arranging step and the coating step during a series of steps. In the arranging step, the base materials are fed to a die opening while being drawn from the reels and the base materials of the plurality of linear conductors 21 and the base material of the flat plate conductor 33 are arranged in parallel at the above-described predetermined gap in the die opening. At that time, the base materials of the plurality of linear conductors 21 is disposed along both ends of the base material of the flat plate conductor 33. Then, in the coating step, the first insulating resin portion 23A covering the outer peripheral portion of one side portion of each of the plurality of linear conductors 21 and the first long side portion 33a of the flat plate conductor 33 and the second insulating resin portion 23B covering the outer peripheral portion of the other side portion of each of the plurality of linear conductors 21 and the second long side portion 33b of the flat plate conductor 33 are extrude-molded by an extruding die having a die opening. Accordingly, in the coating step, the first long side portion 33a of the flat plate conductor 33 forming the side edge portion 32a and the outer peripheral portion of one side portion of each of the plurality of linear conductors 21 are coated by the first insulating resin portion 23A, and the second long side portion 33b of the flat plate conductor 33 forming the side edge portion 32b and the outer peripheral portion of the other side portion of each of the plurality of linear conductors 21 are coated by the second insulating resin portion 23B. Thus, in the arranging step and the coating step, an elongated flat circuit body 60 is formed in which the plurality of linear conductors 21 forming the flat cable-shaped voltage detection line 40 is disposed as a pair of linear conductors at each of both sides of the flat plate conductor 33 (see FIG. 5B).

Next, the pressing step illustrated in FIG. 6A will be described. In the pressing step, the flat circuit body 60 is cut in a desired longitudinal length and the plurality of partition insertion portions 45 and the terminal insertion holes 34 are punched with a predetermined gap P in the longitudinal direction of the flat plate conductor 33 of the flat circuit body 60 so as to form the plurality of busbars 32A. At this time, the length of the partition insertion portion 45 in the longitudinal direction is set so that the adjacent busbars 32A are reliably separated from each other. Further, in the step of pressing the battery wiring module 30A, two busbars (the cathode busbar and the anode busbar) 32B are formed along with the terminal insertion hole 34 by the punching of the partition insertion portion 45 and the punching of the terminal insertion hole 34. In the battery wiring module 30A, the length of the partition insertion portion 45 in the longitudinal direction is set so that the busbars 32A and the busbar 32B adjacent to each other are reliably separated from each other. Then, in the step of pressing the battery wiring module 30A, the cut raised portion 36 is also formed in each of the base portions of two busbars 32B. Further, in the pressing step, the pressing operation can be performed at the same time by appropriately changing a gap P between the partition insertion portions 45, a gap between the pair of terminal insertion holes 34 of the busbar 32A, or the inner diameter of the terminal insertion hole 34 of the busbar 32 in response to the size of the battery cell 12. For this reason, in the pressing step, various different battery wiring modules 30A and 30B can be easily formed by one kind of flat circuit body 60.

Next, the cutting step illustrated in FIG. 6B will be described. In the cutting step, the plurality of busbars 32 disposed in series is cut so as to be divided into a plurality of busbar groups. In the drawing, twelve busbars 32A are divided into two busbar groups 61A and 61B. Further, in the cutting step, there is a case in which the plurality of busbars is cut into at least one busbar group having one busbar 32B provided at each of both ends of the plurality of busbars 32A. In this case, the battery wiring module 30A is formed. Further, in the cutting step, the second insulating resin portion 23B is cut along the other side edge portion 32b so that the plurality of linear conductors 21 is disposed in parallel only at one side edge portion 32a of each of six busbars 32A of the busbar group 61A, and the first insulating resin portion 23A is cut along the other side edge portion 32b so that the plurality of linear conductors 21 is disposed in parallel only in one side edge portion 32a of each of six busbars 32A of the busbar group 61B. That is, in the cutting step, the flat circuit body 60 is cut along the line X-X of FIG. 6A so as to thereby form the pair of busbar groups 61A and 61B illustrated in FIG. 6B. At that time, the first insulating resin portion 23A or the second insulating resin portion 23B as the cutting object is cut so as to be divided into the busbar groups 61A and 61B and the plurality of linear conductors 21. Accordingly, the first insulating resin portion 23A or the second insulating resin portion 23B remaining along the other side edge portion 32b of the busbar 32 is formed as the connection portion 42 continuous in the longitudinal direction.

Figure 7A:
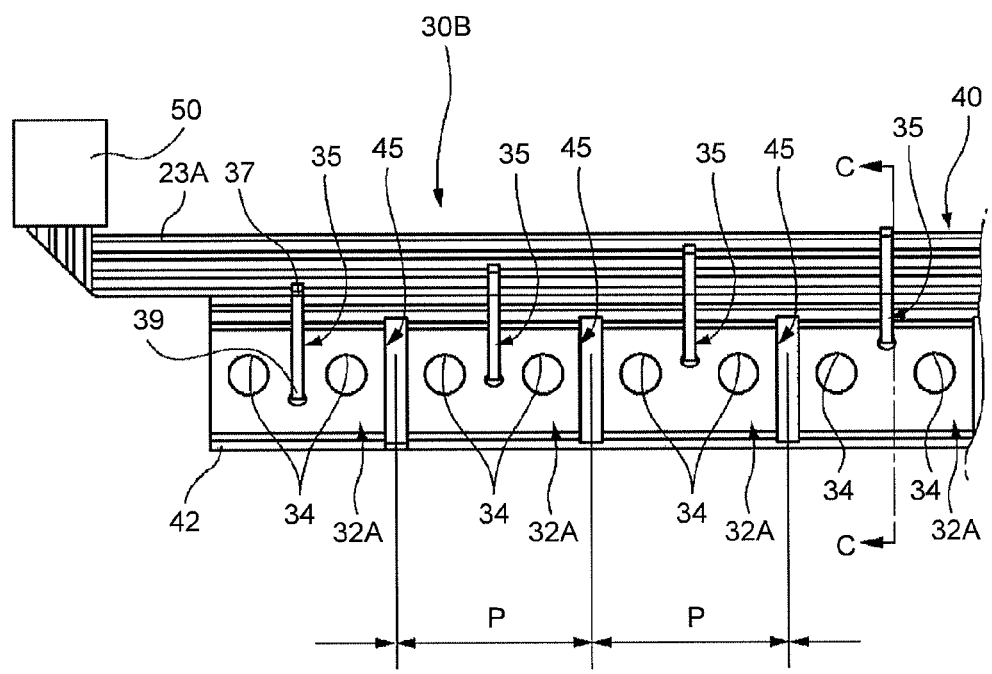
FIG. 7A is a partial top view of the battery wiring module.
Figure 7B:
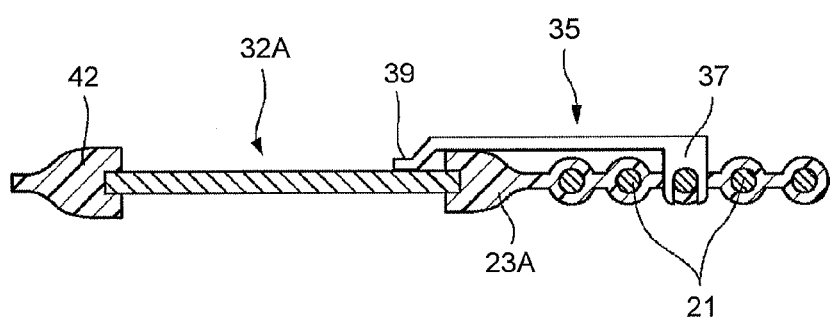
FIG. 7B is a cross-sectional view taken along the line C-C of FIG. 7A.

Next, the connecting step illustrated in FIGS. 7A and 7B will be described. In the connecting step, the plurality of linear conductors 21 of each of the busbar groups 61A and 61B is electrically connected to the predetermined busbar 32A by the connection conductor 35. In the connecting step, in each of the busbar groups 61A and 61B, one end of the connection conductor 35 is press-connected to the predetermined linear conductor 21 coated by the first insulating resin portion 23A or the second insulating resin portion 23B, and the other end of the connection conductor 35 is electrically connected to the predetermined busbar 32A. Specifically, in the connection conductor 35, a pressure-contact blade portion 37 formed at one end of the body is press-connected to the predetermined linear conductor 21 and a welded portion 39 formed at the other end of the body is weld-connected to the predetermined busbar 32A. Further, in the step of connecting the battery wiring module 30A, the cut raised portion 36 is electrically connected to the predetermined linear conductor 21 coated by the first insulating resin portion 23A or the second insulating resin portion 23B. Specifically, the front end of the cut raised portion 36 is weld-connected to the predetermined linear conductor 21. In the connecting step, the connector 50 is connected and fixed to one end of the voltage detection line 40. In the embodiment, the battery wiring modules 30A and 30B are completed in this way.

The battery wiring modules 30A and 30B with such a configuration can be placed on each row of the electrode terminals of the battery module 20 obtained by overlapping twelve battery cells 12.

Next, as illustrated in FIG. 8A, in the battery wiring modules 30A and 30B, the electrode terminals (the cathode terminal 13A and the anode terminal 13B) as the connection objects are inserted through all terminal insertion holes 34 of the busbar 32, and the partition portion 24 of the separator 22 is inserted through the partition insertion portion 45.

Then, the nuts 15 are screw-connected to the cathode terminal 13A and the anode terminal 13B protruding from the terminal insertion holes 34 and are fastened. The busbar 32 is fixed to the electrode terminals (the cathode terminal 13A and the anode terminal 13B) by the fastening of the nuts 15 and is electrically connected to the electrode terminals. The battery pack 10 is completely obtained in a manner such that the nuts 15 are fastened to the cathode terminal 13A and the anode terminal 13B and the battery wiring modules 30A and 30B are provided in the battery module 20.

As described above, in the method for manufacturing the battery wiring modules 30A and 30B according to the embodiment, the elongated flat circuit body 60 in which the plurality of linear conductors 21 is disposed in parallel at both sides of the flat plate conductor 33 is formed in a manner such that the outer peripheral portion of one side portion of each of the plurality of linear conductors 21 and the first long side portion 33a of the elongated flat plate conductor 33 are coated by the first insulating resin portion 23A extrude-molded at the same time, and the outer peripheral portion of the other side portion of each of the plurality of linear conductors 21 and the second long side portion 33b of the flat plate conductor 33 are coated by the second insulating resin portion 23B extruded-molded at the same time in the coating step. Since the flat circuit body 60 is continuously formed by an extrude-molding process using a publicly known extruder (not illustrated), the manufacturing cost is easily decreased.

Then, in the method for manufacturing the battery wiring modules 30A and 30B, the terminal insertion holes 34 are also punched along with the plurality of partition insertion portions 45 punched in the flat circuit body 60 at a predetermined gap P in the longitudinal direction of the flat plate conductor 33 in the pressing step, and are divided into each of battery wiring modules (the battery wiring module 30A, the battery wiring module 30B, or the battery wiring modules 30A and 30B) in the cutting step.

For this reason, in the manufacturing method, it is possible to easily form the plurality of busbars 32A and 32B of which the gap p between the partition insertion portions 45, the gap between the pair of terminal insertion holes 34 of the busbar 32A, or the inner diameter of the terminal insertion hole 34 of the busbar 32 is appropriately changed in response to the size of the battery cell 12. Thus, in the manufacturing method, it is possible to obtain the battery wiring modules 30A and 30B having extremely high versatility. Further, according to the manufacturing method, the plurality of busbars 32A and 32B is integrally arranged along the linear conductor 21 through the first insulating resin portion 23A. For this reason, in the manufacturing method, it is possible to form the battery wiring modules 30A and 30B which do not need an additional member used to dispose the battery wiring module in the battery module 20. Thus, in the manufacturing method, it is possible to obtain the battery wiring modules 30A and 30B having excellent attachment workability when the battery wiring modules are combined with the battery module 20.

Further, in the method for manufacturing the battery wiring module 30A according to the embodiment, the front end of the cut raised portion 36 bent in the side edge of the busbar 32B is weld-connected to the predetermined linear conductor 21 in the voltage detection line 40 in the connecting step. For this reason, in the manufacturing method, the predetermined busbar 32B and the linear conductor 21 can be electrically connected to each other by a simple operation in which the front end of the cut raised portion 36 formed in the busbar 32B is welded to the predetermined linear conductor 21.

Further, in the method for manufacturing the battery wiring modules 30A and 30B according to the embodiment, in the connecting step, the pressure-contact blade portion 37 of one end of the connection conductor 35 is press-connected to the predetermined linear conductor 21 among the plurality of linear conductors 21 coated by the first insulating resin portion 23A, and the welded portion 39 of the other end is weld-connected to the predetermined busbar 32A. For this reason, in the manufacturing method, the predetermined linear conductor 21 and the busbar 32A can be electrically connected to each other by a simple operation in which the pressure-contact blade portion 37 formed at one end of the connection conductor 35 is press-connected to the linear conductor 21 and the welded portion 39 formed at the other end of the connection conductor 35 is weld-connected to the busbar 32A.

Second Embodiment

Next, a method for manufacturing a battery wiring module 80 according to a second embodiment of the present invention will be described. In the embodiment, the manufacturing method for the first embodiment is partially changed. For this reason, in the description of the embodiment below, a description will be made by exemplifying the battery wiring module 30B of the first embodiment. Accordingly, the same reference numerals will be given to the same components as the battery wiring module 30B, and the repetitive description thereof will be omitted. In addition, the method for manufacturing the battery wiring module 80 according to the embodiment is exemplified based on the configuration of the battery wiring module 30B including one kind of busbar 32A. However, the same applies to the configuration based on the battery wiring module 30A including two kinds of busbars 32A and 32B.

Figure 9A:
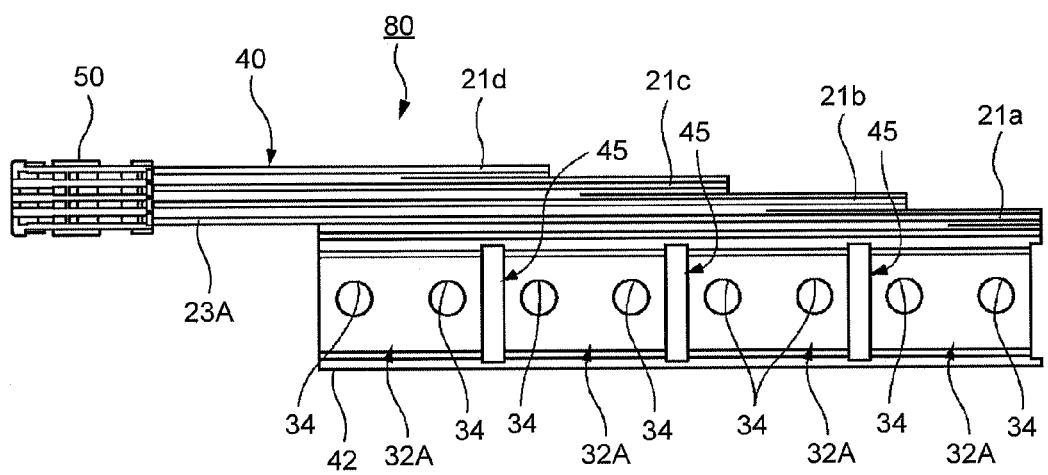
FIG. 9A is a top view of a battery wiring module before a connecting step according to a second embodiment of the present invention.

In the battery wiring module 80 according to the embodiment, the elongated flat circuit body 60 is formed in the arranging step and the coating step similarly to the battery wiring module 30B of the first embodiment (see FIG. 5B). Then, the flat circuit body 60 is cut in a desired longitudinal length. Subsequently, in the pressing step, the plurality of partition insertion portion 45 and the terminal insertion holes 34 are punched in the flat circuit body 60 in the longitudinal direction of the flat plate conductor 33. Further, in the cutting step, the pair of busbar groups 61A and 61B in which the plurality of linear conductors 21 is disposed in parallel is formed only in one side edge portion 32a of each of the plurality of busbars 32A disposed in series. Then, as illustrated in FIG. 9A, four busbars 32A of each of the busbar groups 61A and 61B are left, and the other portion of the flat plate conductor 33 and a part of the voltage detection line 40 are cut.

At one end of the voltage detection line 40 partially punched along with the other portion of the flat plate conductor 33, the protrusion length thereof decreases as the gap between the busbar 32A and the plurality of linear conductors 21 coated by the first insulating resin portion 23A increases.

Figure 9B:
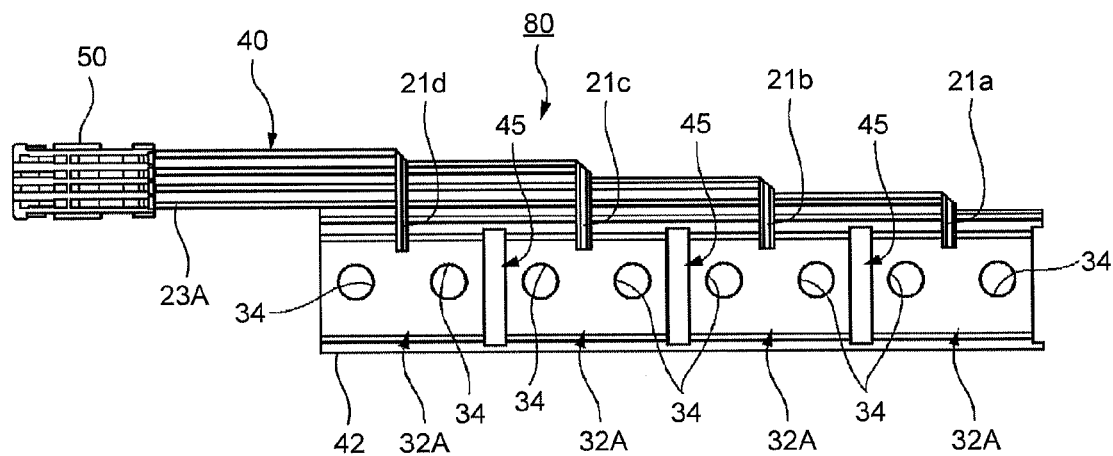
FIG. 9B is a top view of the battery wiring module subjected to the connecting step according to the second embodiment of the present invention.

Next, as illustrated in FIG. 9B, in the connecting step, the first insulating resin portion 23A between the plurality of linear conductors 21 at one end of the voltage detection line 40 is cut, and the linear conductors 21 at one end are electrically connected to the predetermined busbars 32A. Specifically, after the first insulating resin portion 23A is cut, ends $21a$, $21b$, $21c$, and $21d$ of the linear conductors 21 of one separated end are bent substantially orthogonally toward the predetermined busbars 32A, and the ends $21a$, $21b$, $21c$, and $21d$ are weld-connected to the predetermined busbars 32A. That is, in this example, the ends $21a$, $21b$, $21c$, and $21d$ serve as an electric connection portion that electrically connects the linear conductor 21 and the predetermined busbar 32A to each other. After the welding connection, in the connecting step, the connector 50 is connected and fixed to one end of the voltage detection line 40. Accordingly, the battery wiring module 80 is completed. In addition, the ends $21a$, $21b$, $21c$, and $21d$ are formed at the opposite side to the connection side of the connector 50.

Thus, in the method for manufacturing the battery wiring module 80 according to the embodiment, the predetermined linear conductor 21 and the busbar 32A can be electrically connected to each other by a simple operation in which the first insulating resin portion 23A between the linear conductors 21 is cut and the ends $21a$, $21b$, $21c$, and $21d$ of the linear conductors 21 are welded to the busbars 32A.

Third Embodiment

Figure 10A:
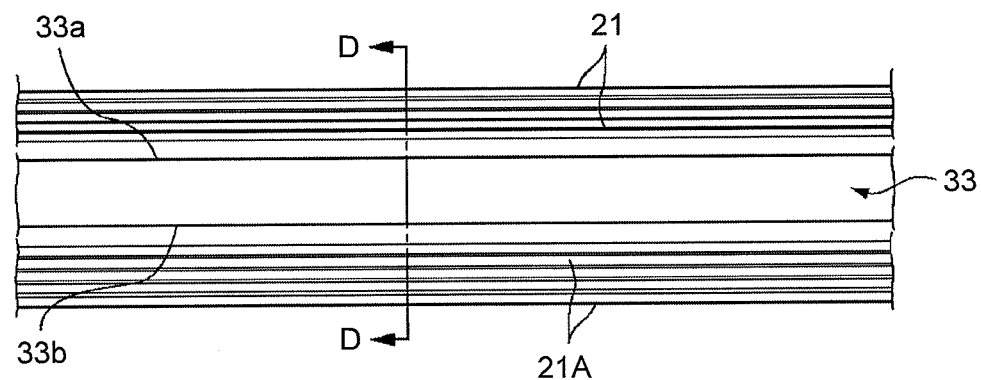
FIG. 10A is a main top view illustrating a step of arranging a battery wiring module according to a third embodiment of the present invention.
Figure 10B:
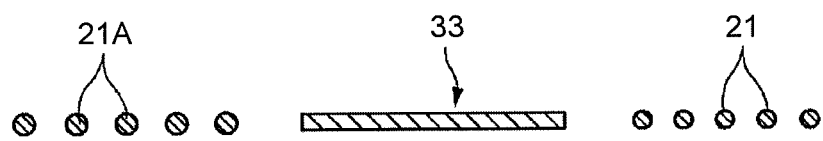
FIG. 10B is a cross-sectional view taken along the line D-D of FIG. 10A.
Figure 10C:
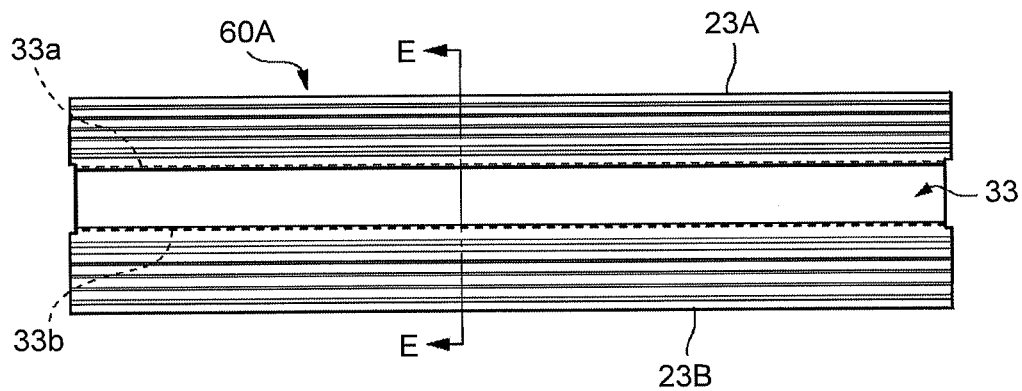
FIG. 10C is a main top view illustrating a step of coating the battery wiring module according to the third embodiment of the present invention.
Figure 10D:
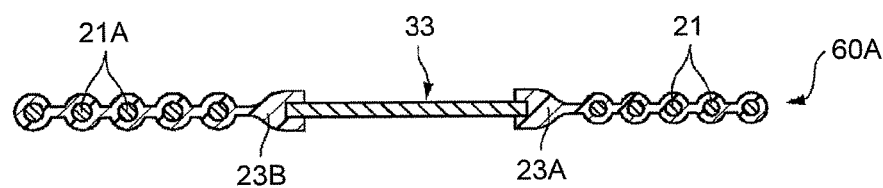
FIG. 10D is a cross-sectional view taken along the line E-E of FIG. 10C.

Next, a method for manufacturing battery wiring modules 90 and 90A according to a third embodiment of the present invention will be described. In the description of the embodiment below, a description will be made by exemplifying the battery wiring module 30B of the first embodiment. Accordingly, the same reference numerals will be given to the same components as the battery wiring module 30B, and the repetitive description thereof will be omitted. In addition, the method for manufacturing the battery wiring modules 90 and 90A according to the embodiment is exemplified based on the configuration of the battery wiring module 30B including one kind of busbar 32A. However, the same applies to the configuration based on the battery wiring module 30A including two kinds of busbars 32A and 32B. Similarly to the above-described embodiments, the method for manufacturing the battery wiring modules 90 and 90A of the embodiment includes an arranging step (see FIGS. 10A and 10B), a coating step (see FIGS. 10C and 10D), a pressing step (see FIGS. 10E and 10F), a cutting step (see FIG. 11A), and a connecting step.

First, the arranging step and the coating step illustrated in FIGS. 10A to 10D will be described. In the arranging step and the coating step, similarly to the above-described embodiments, the plurality of linear conductors 21 is disposed in parallel along the first long side portion 33a of the flat plate conductor 33, and the plurality of linear conductors 21A is disposed in parallel along the second long side portion 33b of the flat plate conductor 33. Then, the plurality of linear conductors is coated by the first insulating resin portion 23A and the second insulating resin portion 23B by an extrude-molding process. Accordingly, here, an elongated flat circuit body 60A is formed which includes the flat cable-shaped voltage detection line 40 with the plurality of linear conductors 21 and the flat cable-shaped voltage detection line 40A with the plurality of linear conductors 21A. Here, the linear conductor 21 and the linear conductor 21A respectively have different cross-sectional shapes (specifically, different wire diameters). In this example, the wire diameter of the linear conductor 21A is larger than that of the linear conductor 21.

Figure 10E:
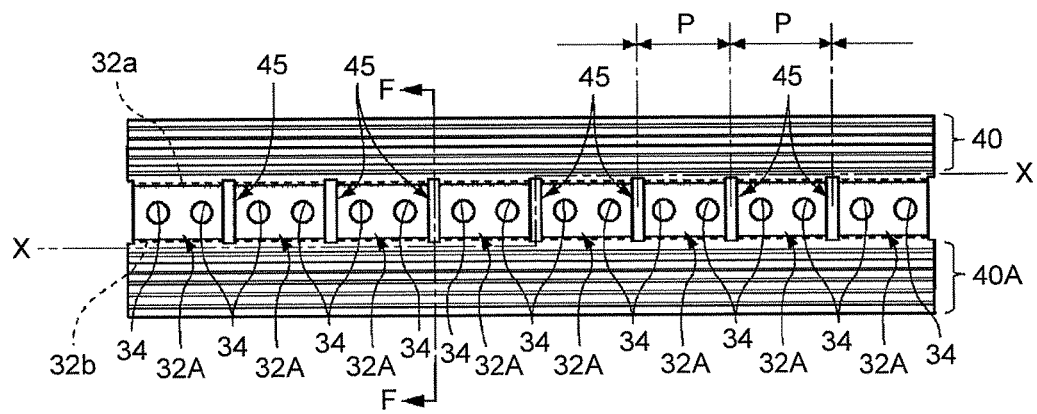
FIG. 10E is a main top view illustrating a step of pressing the battery wiring module according to the third embodiment of the present invention.
Figure 10F:
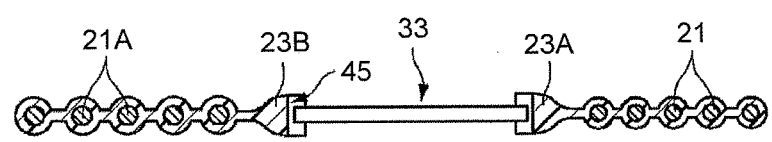
FIG. 10F is a cross-sectional view taken along the line F-F of FIG. 10E.

Next, in the pressing step illustrated in FIGS. 10E and 10F, similarly to the above-described embodiment, the flat circuit body 60A is cut in a desired longitudinal length, and the terminal insertion holes 34 are punched while the plurality of partition insertion portions 45 is punched in the flat circuit body 60A at a predetermined gap P in the longitudinal direction of the flat plate conductor 33, thereby forming the plurality of busbars 32 (32A).

Figure 11A:
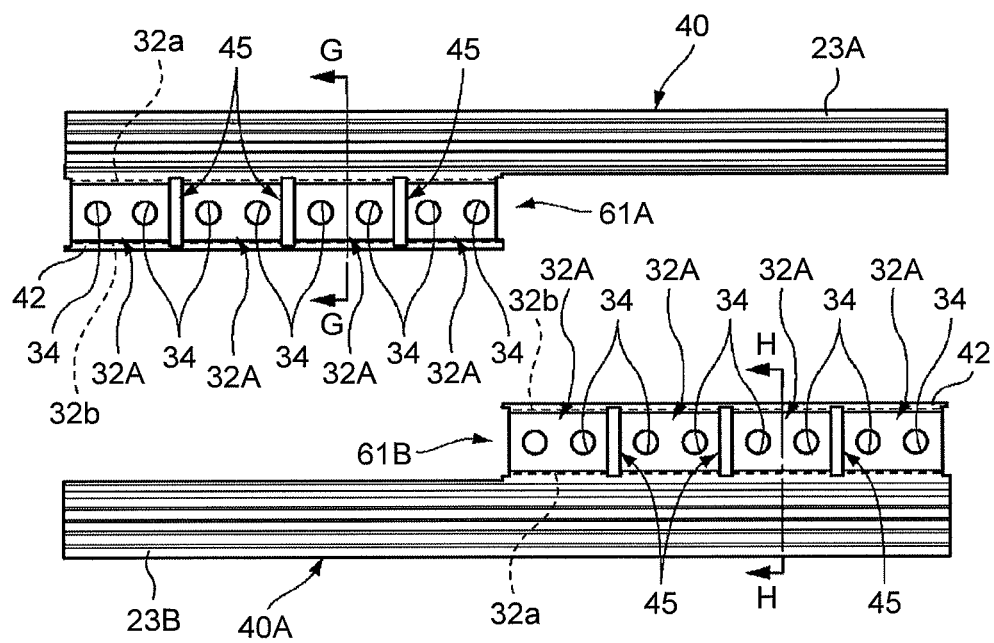
FIG. 11A is a main top view illustrating a step of cutting the battery wiring module according to the third embodiment of the present invention.
Figure 11B:
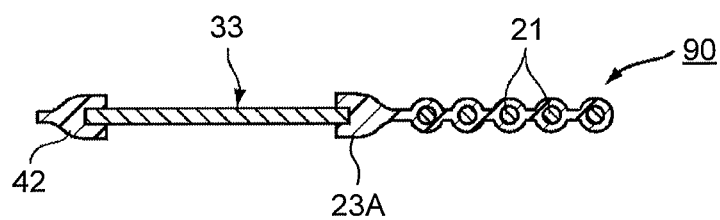
FIG. 11B is a cross-sectional view taken along the line G-G of FIG. 11A.
Figure 11C:
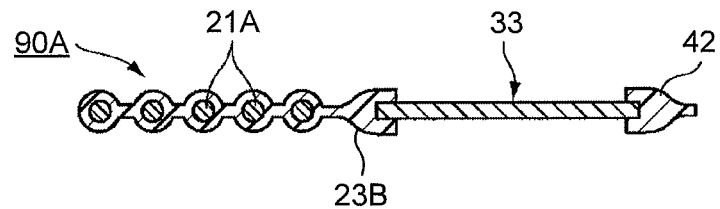
FIG. 11C is a cross-sectional view taken along the line H-H of FIG. 11A.

Next, in the cutting step illustrated in FIGS. 11A to 11C, similarly to the above-described embodiments, the plurality of (in the embodiment, eight) busbars 32A disposed in series is divided into the plurality of (in the embodiment, two) busbar groups 61A and 61B, and the first insulating resin portion 23A and the second insulating resin portion 23B are cut at a predetermined position. That is, in the cutting step, the flat circuit body 60A is cut along the line X-X of FIG. 10E so as to thereby form the pair of busbar groups 61A and 61B illustrated in FIG. 11A. In the busbar group 61A, the plurality of linear conductors 21 is connected through the first insulating resin portion 23A, and the connection portion 42 is formed by the second insulating resin portion 23B. Meanwhile, in the busbar group 61B, the plurality of linear conductors 21A is connected through the second insulating resin portion 23B, and the connection portion 42 is formed by the first insulating resin portion 23A.

Next, in the connecting step, similarly to the battery wiring modules 30A, 30B, and 80 of the first or second embodiment, the plurality of linear conductors 21 and 21A of the busbar groups 61A and 61B is electrically connected to the predetermined busbars 32A by the connection conductor 35 or others. Further, the busbar 32B is electrically connected to the predetermined linear conductor 21 or 21A by the cut raised portion 36. Then, here, the connector 50 is connected and fixed to one end of the voltage detection line 40 or 40A, thereby forming the pair of battery wiring modules 90 and 90A respectively including the plurality of linear conductors 21 and 21A having different wire diameters.

In this way, in the manufacturing method according to the embodiment, the pair of battery wiring modules 90 and 90A can be formed at the same time. For this reason, in the manufacturing method, the pair of battery wiring modules 90 and 90A respectively provided with different linear conductors 21 and 21A can be efficiently obtained. In addition, the manufacturing method has, of course, the same operation and effect as the method for manufacturing the battery wiring modules 30A, 30B, and 80 of the first or second embodiment. In addition, in the method for manufacturing the battery wiring modules 90 and 90A according to the embodiment, the linear conductors 21 and 21A having different wire diameters are exemplified as the linear conductors having different cross-sectional shapes. However, as the linear conductors having different cross-sectional shapes, a stranded wire or a single wire of a flat conductor and a round conductor can be variously used. Further, as the linear conductors having different physical properties (materials), a linear conductor formed of copper alloy or aluminum alloy can be used.

Fourth Embodiment

Next, a method for manufacturing a battery wiring module 100 according to a fourth embodiment of the present invention will be described. In the embodiment, a connection force between the first insulating resin portion 23A or the second insulating resin portion 23B and the busbar 32A is increased in the battery wiring modules 30A and 30B of the first embodiment. In the description of the embodiment below, a description will be made by exemplifying the battery wiring module 30B of the first embodiment. Accordingly, the same reference numerals will be given to the same components as the battery wiring module 30B, and the repetitive description thereof will be omitted. In addition, the method for manufacturing the battery wiring module 100 according to the embodiment is exemplified based on the configuration of the battery wiring module 30B including one kind of busbar 32A. However, the same applies to the configuration based on the battery wiring module 30A including two kinds of busbars 32A and 32B. Similarly to the above-described embodiments, the method for manufacturing the battery wiring module 100 according to the embodiment includes an arranging step (see FIGS. 12A and 14A), a coating step (see FIGS. 12B and 14B), a pressing step (see FIGS. 13A and 14C), a cutting step (see FIGS. 13B and 14D), and a connecting step.

Figure 12A:
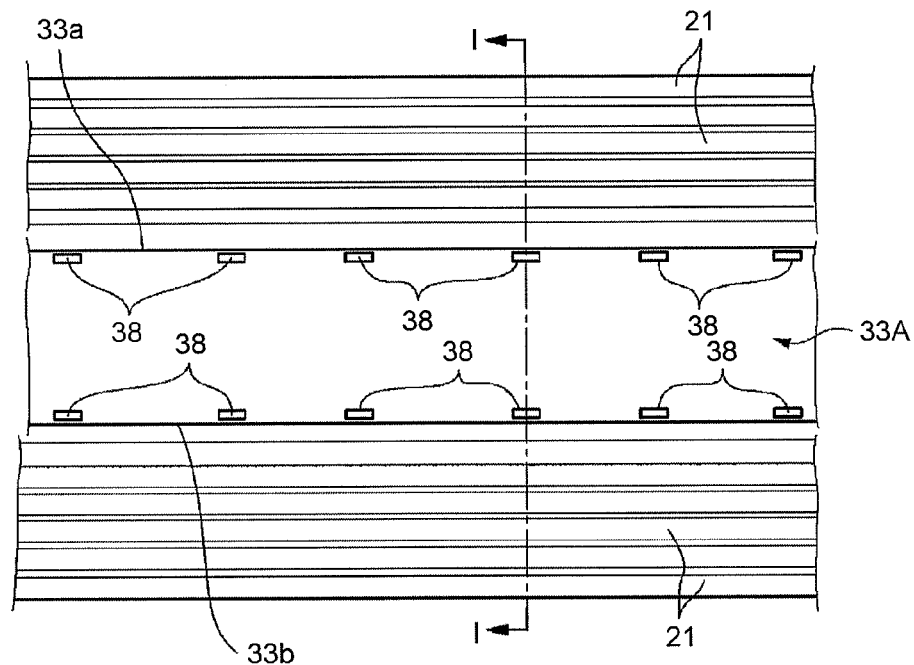
FIG. 12A is a main top view illustrating a step of arranging a battery wiring module according to a fourth embodiment of the present invention.
Figure 12B:
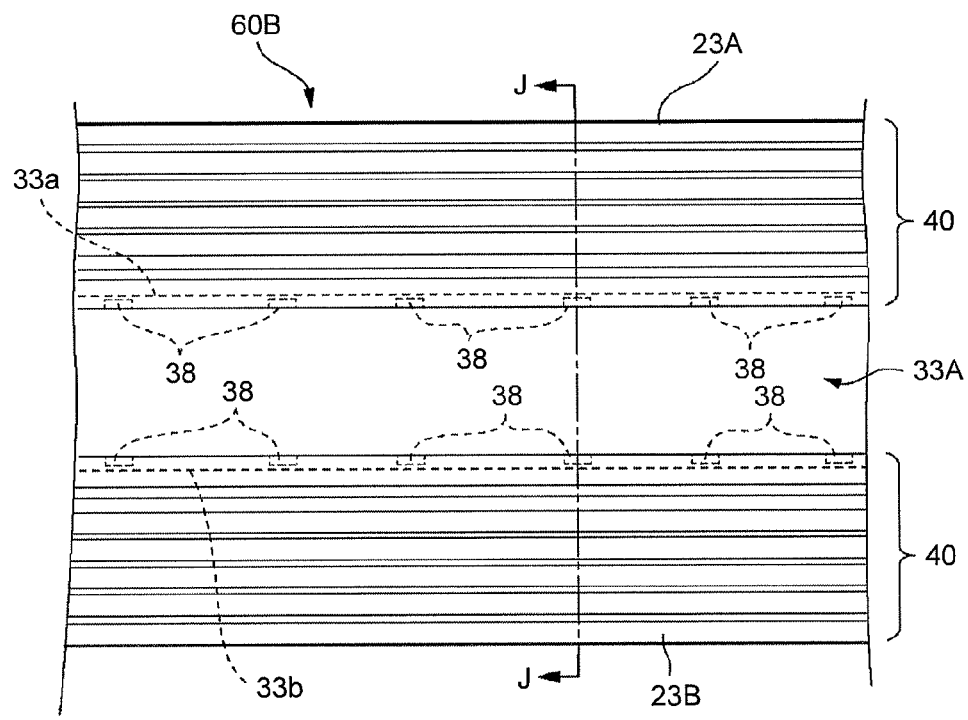
FIG. 12B is a main top view illustrating a step of coating the battery wiring module according to the fourth embodiment of the present invention.

First, the arranging step and the coating step illustrated in FIGS. 12A and 12B will be described. In the arranging step and the coating step, the plurality of linear conductors 21 is disposed in parallel along the first long side portion 33a of an elongated rectangular flat plate conductor 33A, and the plurality of linear conductors 21 is disposed in parallel along the second long side portion 33b of the flat plate conductor 33A. Then, the plurality of linear conductors is coated by the first insulating resin portion 23A and the second insulating resin portion 23B by an extrude-molding process. Accordingly, here, the flat cable-shaped voltage detection lines 40 each having the plurality of linear conductors 21 are formed along the first long side portion 33a and the second long side portion 33b of the flat plate conductor 33A.

Figure 13A:
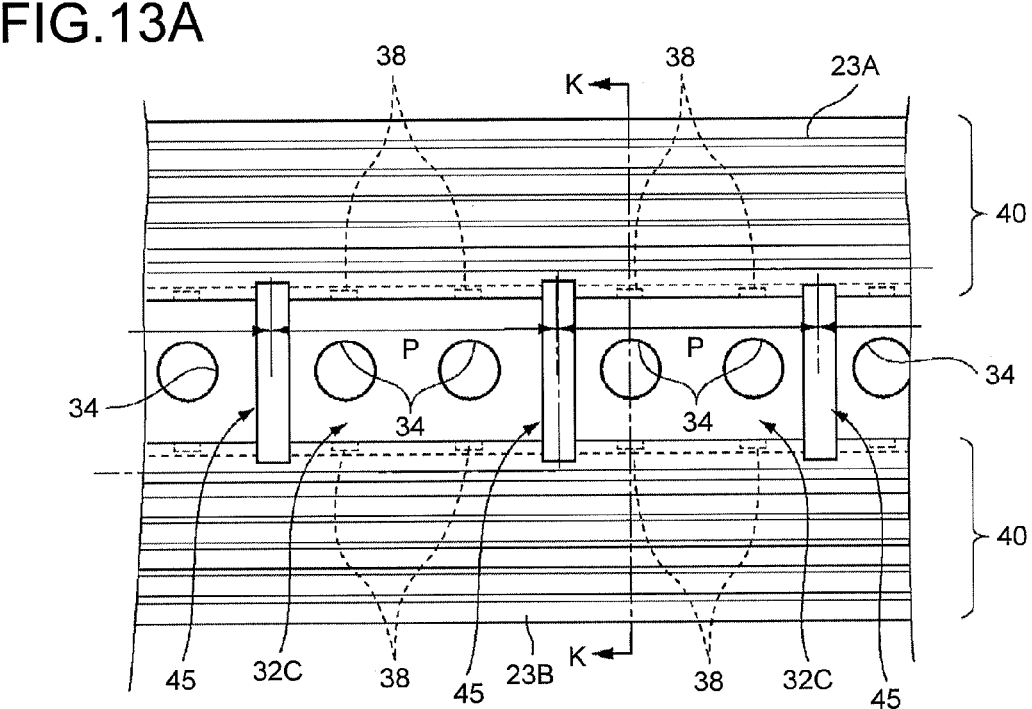
FIG. 13A is a main top view illustrating a step of pressing the battery wiring module according to the fourth embodiment of the present invention.
Figure 13B:
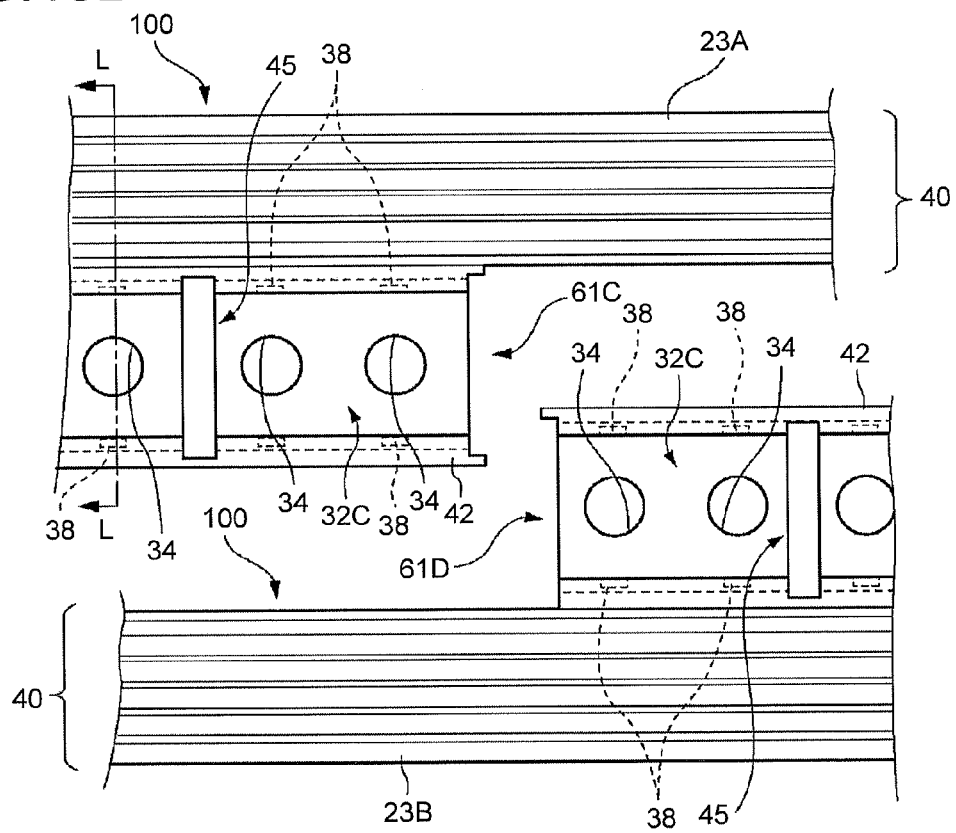
FIG. 13B is a main top view illustrating a step of cutting the battery wiring module according to the fourth embodiment of the present invention.
Figure 14A:
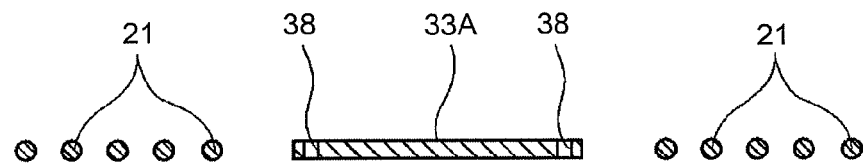
FIG. 14A is a cross-sectional view taken along the line I-I of FIG. 12A.
Figure 14B:
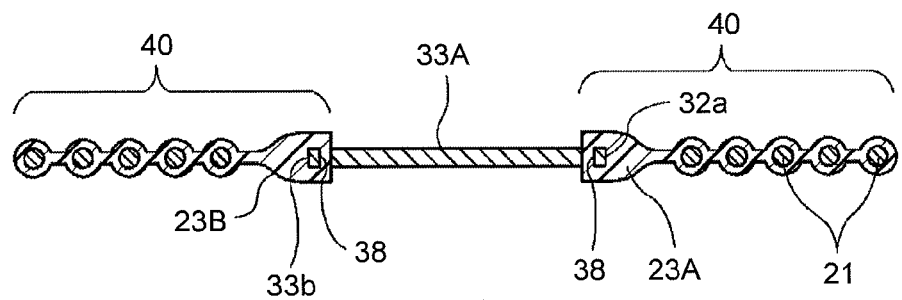
FIG. 14B is a cross-sectional view taken along the line J-J of FIG. 12B.
Figure 14C:
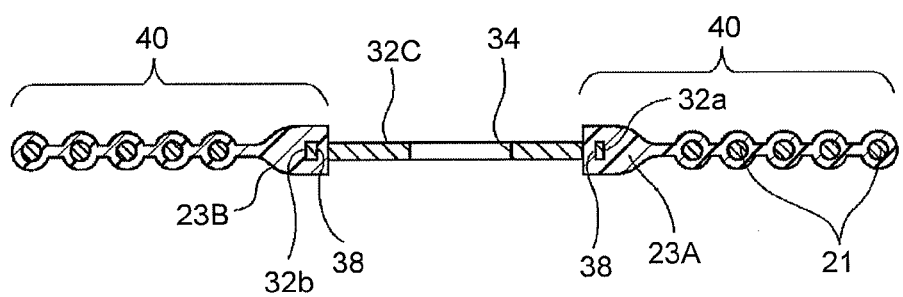
FIG. 14C is a cross-sectional view taken along the line K-K of FIG. 13A.
Figure 14D:
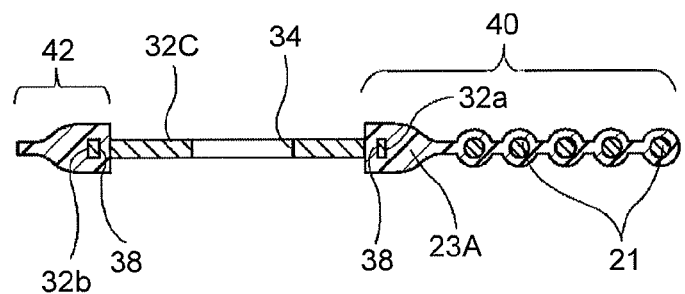
FIG. 14D is a cross-sectional view taken along the line L-L of FIG. 13B.

Here, in an elongated flat circuit body 60B including the flat plate conductor 33A and two voltage detection lines 40, a connection reinforcement portion for increasing a connection force between the first insulating resin portion 23A and a busbar 32C and a connection force between the second insulating resin portion 23B and the busbar 32C is formed before the coating step. That is, in the manufacturing method of the embodiment, a step of forming the connection reinforcement portions is provided before the coating step. The step of forming the connection reinforcement portion may be provided between the arranging step and the coating step or may be provided before the base material of the flat plate conductor 33A is wound as a reel. The connection reinforcement portion is formed as a through-hole 38 at a plurality of positions of the first long side portion 33a and the second long side portion 33b of the flat plate conductor 33A. The through-holes 38 are provided at a predetermined gap in the longitudinal direction of the first long side portion 33a and the second long side portion 33b. In this example, as illustrated in FIGS. 13A and 13B, the busbar 32C is provided with two through-holes 38. Further, although not illustrated in the drawings, the busbar 32B may be provided with at least one through-hole 38. Thus, in the coating step, insulating resin forming the first insulating resin portion 23A or the second insulating resin portion 23B also enters the through-hole 38. For this reason, in the battery wiring module 100, a connection force between the first insulating resin portion 23A and the busbar 32C and a connection force between the second insulating resin portion 23B and the busbar 32C are improved.

Next, in the pressing step illustrated in FIG. 13A, the flat circuit body 60B is cut in a desired longitudinal length, and the terminal insertion holes 34 are punched along with the plurality of partition insertion portions 45 punched in the flat circuit body 60B at a predetermined gap P in the longitudinal direction of the flat plate conductor 33A, thereby forming two busbar groups 61C and 61D with the plurality of busbars 32C. At this time, the longitudinal length of the partition insertion portion 45 is set so that the adjacent busbars 32C are reliably separated from each other. Further, the partition insertion portion 45 is punched at a position different from the through-hole 38.

As the connecting step, any one of the connecting steps described in the first to third embodiments may be employed. Accordingly, the battery wiring module 100 is completed.

In the method for manufacturing the battery wiring module 100 according to the embodiment, since the connection reinforcement portion formed as the through-hole 38 is provided in the first and second long side portions 33a and 33b of the flat plate conductor 33A, a connection force between the busbar 32C having the partition insertion portion 45 punched therein and the first insulating resin portion 23A and a connection force between the busbar 32C and the second insulating resin portion 23B can be increased. For this reason, in the manufacturing method, it is possible to prevent a problem in which the busbar 32C is carelessly separated from the first insulating resin portion 23A or the second insulating resin portion 23B even when the side edge portions 32a and 32b of the busbar 32C are not largely covered by the first insulating resin portion 23A or the second insulating resin portion 23B (the connection portion 42). In addition, the manufacturing method has, of course, the same operation and effect as the manufacturing methods of the first to third embodiments. In addition, the connection reinforcement portion is not limited to the through-hole 38 of the embodiment. For example, a bent portion may be provided in the first long side portion 33a and the second long side portion 33b of the flat plate conductor 33A. It is needless to mention that various configurations can be used based on the spirit of the present invention.

As described above, in the method for manufacturing the battery wiring modules 30A, 30B, 80, 90A, and 100 according to the above-described embodiments, it is possible to easily wire the battery cells 12 with a simple structure, to improve the versatility, and to decrease the manufacturing cost.

In addition, the present invention is not limited to the above-described embodiments, and appropriate modification and improvement can be made. In addition, the materials, the shapes, the dimensions, the number, and the arrangement positions of the components of the above-described embodiments are not limited as long as the present invention can be achieved.

According to the method for manufacturing a battery wiring module of the present invention, it is possible to easily wire the battery cells with a simple structure, to increase the versatility, and to decrease the manufacturing cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for manufacturing a battery wiring module comprising steps of:
    coating a first long side portion of an elongated flat plate conductor and outer peripheral portions of a plurality of linear conductors by a first insulating resin portion, the linear conductors being disposed along the first long side portion in parallel with a predetermined gap therebetween while having a predetermined gap with respect to the first long side portion;
    coating a second long side portion of the flat plate conductor and outer peripheral portions of the plurality of linear conductors by a second insulating resin portion, the linear conductors being disposed along the second long side portion in parallel with a predetermined gap therebetween while having a predetermined gap with respect to the second long side portion;
    separating the flat plate conductor at a predetermined gap in the longitudinal direction of the flat plate conductor;
    forming a plurality of busbars electrically connecting electrode terminals provided in at least two battery cells connected to each other in the same direction among the plurality of battery cells overlapping each other in the same direction, the electrode terminals being arranged in parallel in the same direction;
    cutting the insulating resin portion so that the plurality of busbars disposed in series is divided into a plurality of busbar groups and the plurality of linear conductors coated by any one insulating resin portion of the first insulating resin portion and the second insulating resin portion is separated from the busbar groups; and
    connecting the plurality of linear conductors to the predetermined busbars.

2. The method for manufacturing the battery wiring module according to claim 1, wherein
    in the separating, a terminal insertion hole causing the electrode terminal to be inserted therethrough is formed in each of the busbars.

3. The method for manufacturing the battery wiring module according to claim 2, wherein
    in the connecting, a gap between the plurality of linear conductors of one end of the other insulating resin portion connecting the plurality of linear conductors and the busbar group is cut, and the linear conductors of the one end is electrically connected to the predetermined busbars of the busbar group.

4. The method for manufacturing the battery wiring module according to claim 2, wherein
    in the connecting, one end of a connection conductor is press-connected to a predetermined linear conductor of the plurality of linear conductors connected to the busbar group through the other insulating resin portion, and the other end of the connection conductor is electrically connected to the predetermined busbar of the busbar group.

5. The method for manufacturing the battery wiring module according to claim 2, wherein in the separating, a cathode busbar electrically connected only to a cathode terminal and an anode busbar electrically connected only to an anode terminal are formed along with the plurality of busbars in the busbar group, and a cut raised portion is formed in each of the cathode busbar and the anode busbar, and in the connecting, the cut raised portion is electrically connected to a predetermined linear conductor of the plurality of linear conductors connected to the busbar group through the insulating resin portion.

6. The method for manufacturing the battery wiring module according to claim 2, wherein before the coating, the plurality of linear conductors coated by the first insulating resin portion is disposed along the first long side portion of the flat plate conductor, and the plurality of linear conductors having at least different cross-sectional shapes or physical properties is disposed along the second long side portion of the flat plate conductor.

7. The method for manufacturing the battery wiring module according to claim 2, further comprising:

forming a connection reinforcement portion which increases a connection force of the first and second insulating resin portions with respect to the flat plate conductor in the first and second long side portions of the flat plate conductor, before the coating.

8. The method for manufacturing the battery wiring module according to claim 1, wherein in the connecting, a gap between the plurality of linear conductors of one end of the other insulating resin portion connecting the plurality of linear conductors and the busbar group is cut, and the linear conductors of the one end is electrically connected to the predetermined busbars of the busbar group.

9. The method for manufacturing the battery wiring module according to claim 8, wherein in the separating, a cathode busbar electrically connected only to a cathode terminal and an anode busbar electrically connected only to an anode terminal are formed along with the plurality of busbars in the busbar group, and a cut raised portion is formed in each of the cathode busbar and the anode busbar, and in the connecting, the cut raised portion is electrically connected to a predetermined linear conductor of the plurality of linear conductors connected to the busbar group through the insulating resin portion.

10. The method for manufacturing the battery wiring module according to claim 8, wherein before the coating, the plurality of linear conductors coated by the first insulating resin portion is disposed along the first long side portion of the flat plate conductor, and the plurality of linear conductors having at least different cross-sectional shapes or physical properties is disposed along the second long side portion of the flat plate conductor.

11. The method for manufacturing the battery wiring module according to claim 8, further comprising:

forming a connection reinforcement portion which increases a connection force of the first and second insulating resin portions with respect to the flat plate conductor in the first and second long side portions of the flat plate conductor, before the coating.

12. The method for manufacturing the battery wiring module according to claim 1, wherein in the connecting, one end of a connection conductor is press-connected to a predetermined linear conductor of the plurality of linear conductors connected to the busbar group through the other insulating resin portion, and the other end of the connection conductor is electrically connected to the predetermined busbar of the busbar group.

13. The method for manufacturing the battery wiring module according to claim 12, wherein in the separating, a cathode busbar electrically connected only to a cathode terminal and an anode busbar electrically connected only to an anode terminal are formed along with the plurality of busbars in the busbar group, and a cut raised portion is formed in each of the cathode busbar and the anode busbar, and in the connecting, the cut raised portion is electrically connected to a predetermined linear conductor of the plurality of linear conductors connected to the busbar group through the insulating resin portion.

14. The method for manufacturing the battery wiring module according to claim 12, wherein before the coating, the plurality of linear conductors coated by the first insulating resin portion is disposed along the first long side portion of the flat plate conductor, and the plurality of linear conductors having at least different cross-sectional shapes or physical properties is disposed along the second long side portion of the flat plate conductor.

15. The method for manufacturing the battery wiring module according to claim 12, further comprising:

forming a connection reinforcement portion which increases a connection force of the first and second insulating resin portions with respect to the flat plate conductor in the first and second long side portions of the flat plate conductor, before the coating.

16. The method for manufacturing the battery wiring module according to claim 1, wherein in the separating, a cathode busbar electrically connected only to a cathode terminal and an anode busbar electrically connected only to an anode terminal are formed along with the plurality of busbars in the busbar group, and a cut raised portion is formed in each of the cathode busbar and the anode busbar, and in the connecting, the cut raised portion is electrically connected to a predetermined linear conductor of the plurality of linear conductors connected to the busbar group through the insulating resin portion.

17. The method for manufacturing the battery wiring module according to claim 16, wherein before the coating, the plurality of linear conductors coated by the first insulating resin portion is disposed along the first long side portion of the flat plate conductor, and the plurality of linear conductors having at least different cross-sectional shapes or physical properties is disposed along the second long side portion of the flat plate conductor.

18. The method for manufacturing the battery wiring module according to claim 1, wherein before the coating, the plurality of linear conductors coated by the first insulating resin portion is disposed along the first long side portion of the flat plate conductor, and the plurality of linear conductors having at least different cross-sectional shapes or physical properties is disposed along the second long side portion of the flat plate conductor.

19. The method for manufacturing the battery wiring module according to claim 1, further comprising:

forming a connection reinforcement portion which increases a connection force of the first and second insulating resin portions with respect to the flat plate conductor in the first and second long side portions of the flat plate conductor, before the coating.

20. The method for manufacturing the battery wiring module according to claim 1, wherein
in the cutting, the insulating resin portion as a cutting object is cut so as to be divided into the busbar group and the plurality of linear conductors.

* * * * *